(12) United States Patent
Zopey et al.

(10) Patent No.: US 10,648,382 B2
(45) Date of Patent: May 12, 2020

(54) INERTING AND VENTING SYSTEM

(71) Applicant: Parker-Hannifin Corporation, Cleveland, OH (US)

(72) Inventors: Ashok G. Zopey, Anaheim, CA (US); Carsten Mehring, Irvine, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 152 days.

(21) Appl. No.: 15/726,175

(22) Filed: Oct. 5, 2017

(65) Prior Publication Data

US 2018/0094557 A1 Apr. 5, 2018

Related U.S. Application Data

(60) Provisional application No. 62/404,268, filed on Oct. 5, 2016.

(51) Int. Cl.
*F01N 3/04* (2006.01)
*B64D 37/08* (2006.01)
(Continued)

(52) U.S. Cl.
CPC .............. *F01N 3/043* (2013.01); *B64D 37/08* (2013.01); *B64D 37/32* (2013.01); *F01N 3/005* (2013.01);
(Continued)

(58) Field of Classification Search
CPC ...... F01N 3/043; F01N 3/005; F01N 2250/02; F01N 2560/025; F01N 2560/06;
(Continued)

(56) References Cited

U.S. PATENT DOCUMENTS

| | | | | | |
|---|---|---|---|---|---|
| 2,983,405 | A | * | 5/1961 | Tayler | B64D 37/32 220/88.3 |
| 3,123,249 | A | * | 3/1964 | Gorand | B65D 90/34 220/745 |

(Continued)

OTHER PUBLICATIONS

"Oxygen and Carbon Dioxide Dual Gas-Responsive and Switchable Microgels Prepared from Emulsion Copolymerization of Fluoro- and Amino-Containing Monomers," Lei, Zhang, Shi and Zhu (Langmuir 2015, vol. 31, No. 7, pp. 2196-2201.
(Continued)

*Primary Examiner* — William M McCalister
(74) *Attorney, Agent, or Firm* — Renner, Otto, Boisselle & Sklar, LLP

(57) ABSTRACT

An inerting and venting system for an aircraft. The inerting and venting system includes a tank containing fluid to be inerted, a mixer including an operating flow path and a mixing flow path, a vent line fluidly connecting ambient atmosphere to the operating flow path of the mixer, and an inert gas line fluidly connecting an inert gas source to the mixing flow path of the mixer. The mixing flow path and the operating flow path are arranged in a coflowing configuration such that ambient air communicated by the operating flow path mixes in a coflowing manner with inert gas communicated by the mixing flow path and the coflowed mixture is directed into the tank. The inerting and venting system may include a first valve for controlling flow of vent air from ambient atmosphere to the tank, and a second valve for controlling flow of inert gas from an inert gas source to the tank. A valve adjuster is configured to passively adjust the first and second valves in response to a pressure differential between the ambient atmosphere and the tank, and to control ratio of flow in response to oxygen concentration in the inert gas or the tank ullage gas.

14 Claims, 19 Drawing Sheets

(51) Int. Cl.
*F01N 3/00* (2006.01)
*B64D 37/32* (2006.01)

(52) U.S. Cl.
CPC .... *F01N 2250/02* (2013.01); *F01N 2560/025* (2013.01); *F01N 2560/06* (2013.01)

(58) Field of Classification Search
CPC ... B64D 37/08; B64D 37/32; Y10T 137/7303; Y10T 137/86292; Y10T 137/86324; Y10T 137/86332; Y10T 137/2012; Y10T 137/5515; Y10T 137/87635; Y10T 137/87668
USPC ...... 137/391, 583, 587, 588, 81.1, 304, 894, 137/898, 907
See application file for complete search history.

(56) References Cited

U.S. PATENT DOCUMENTS

| | | | | |
|---|---|---|---|---|
| 3,587,618 | A * | 6/1971 | Kenyon | B64D 37/32 137/87.06 |
| 3,628,758 | A * | 12/1971 | Nichols | B64D 37/32 244/135 R |
| 3,691,730 | A * | 9/1972 | Hickey | B64D 37/32 96/161 |
| 3,710,549 | A * | 1/1973 | Nichols | B64D 37/32 261/36.1 |
| 3,732,668 | A * | 5/1973 | Nichols | B64D 37/32 96/174 |
| 3,788,040 | A * | 1/1974 | Bragg | B64D 37/32 96/164 |
| 3,948,626 | A | 4/1976 | Bragg | |
| 5,588,458 | A * | 12/1996 | Ushitora | E03F 1/006 137/205 |
| 6,634,598 | B2 * | 10/2003 | Susko | B64D 37/32 137/209 |
| 6,820,659 | B2 | 11/2004 | Sauer | |
| 6,830,219 | B1 * | 12/2004 | Picot | B01D 19/0005 244/121 |
| 7,204,868 | B2 * | 4/2007 | Snow, Jr. | A62C 3/06 96/135 |
| 7,442,230 | B2 | 10/2008 | Snow, Jr. | |
| 7,509,968 | B2 * | 3/2009 | Surawski | B64D 37/32 137/2 |
| 8,074,932 | B2 * | 12/2011 | Surawski | B64D 37/32 137/209 |
| 8,517,056 | B2 * | 8/2013 | Cullin | E03B 1/04 137/337 |
| 8,777,165 | B2 * | 7/2014 | Roscoe | B64D 37/08 244/135 C |
| 9,254,923 | B2 * | 2/2016 | Hashimoto | B64D 37/32 |
| 9,511,874 | B2 * | 12/2016 | Tiger | B64D 37/32 |
| 2003/0116679 | A1 * | 6/2003 | Susko | B64D 37/32 244/135 R |
| 2007/0157605 | A1 | 7/2007 | Hoff, Jr. | |
| 2008/0017248 | A1 * | 1/2008 | Massey | A62C 3/065 137/14 |
| 2010/0175900 | A1 * | 7/2010 | DeFrancesco | B64D 37/32 169/62 |
| 2012/0087807 | A1 * | 4/2012 | Buchwald | B64D 37/24 417/54 |
| 2015/0096984 | A1 | 4/2015 | Ashton et al. | |
| 2015/0217153 | A1 * | 8/2015 | Jones | A62C 3/08 169/62 |
| 2016/0051926 | A1 * | 2/2016 | Burnell | B01D 53/22 95/54 |
| 2016/0052639 | A1 * | 2/2016 | Burnell | B64D 37/32 95/46 |
| 2016/0311551 | A1 * | 10/2016 | Daniello | B64D 37/32 |

OTHER PUBLICATIONS

"Oxygen and Carbon Dioxide Dual Responsive Nanoaggregates of Fluoro- and Amino-Containing Copolymer," Zhang and Zhu, ACS Macro Lett., 2014, vol. 3, No. 8, pp. 743-746.
"Gas-Responsive Polymers," Qi Zhang, Lei Lei, and Shiping Zhu, ACS Macro Lett. 2017, No. 6, pp. 515-522.
"Active Polymer Gel Actuators," S. Maeda, et al., Int. J. Mol. Sci. 2010, 11, 52-66.

* cited by examiner

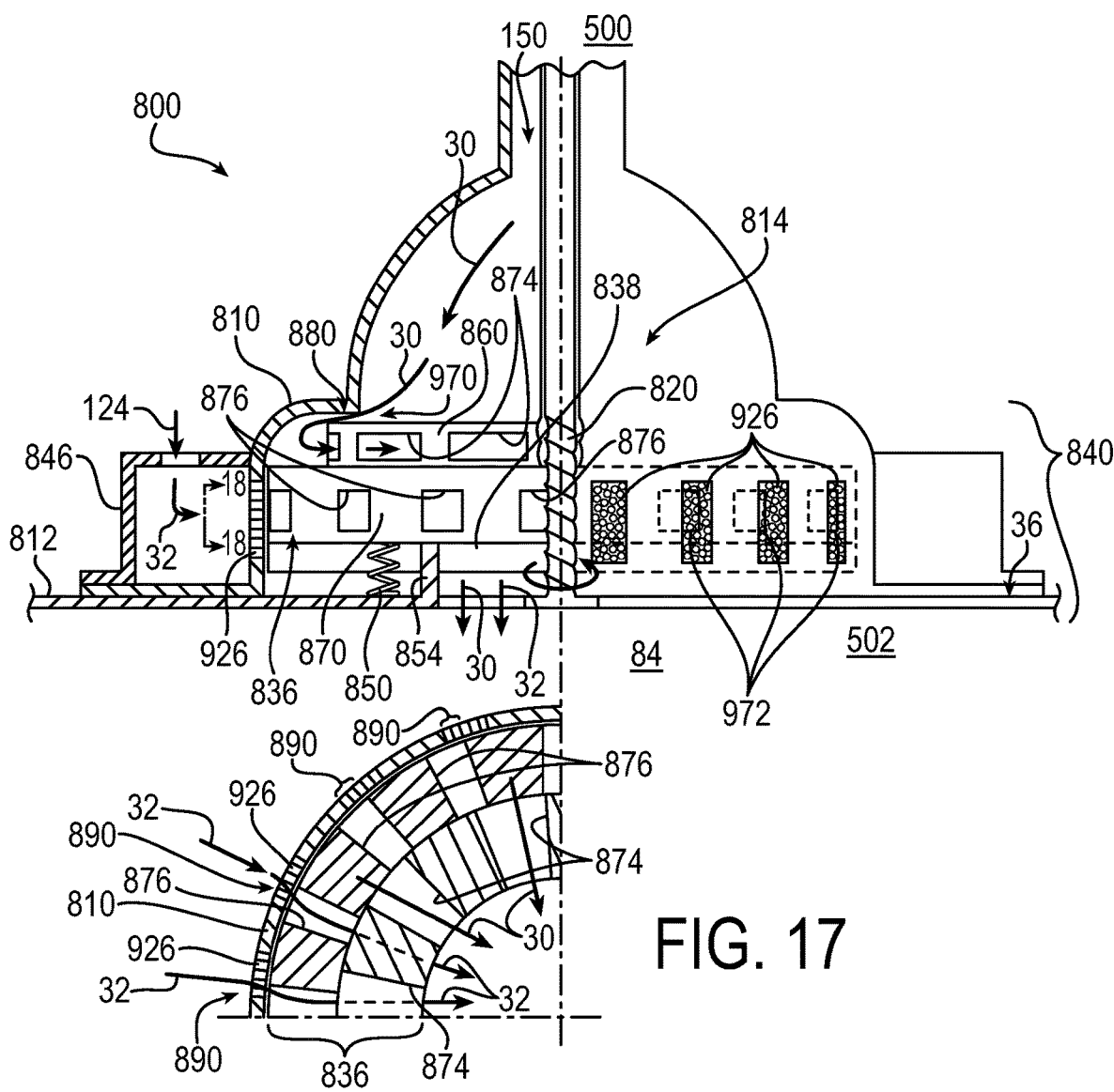
FIG. 17
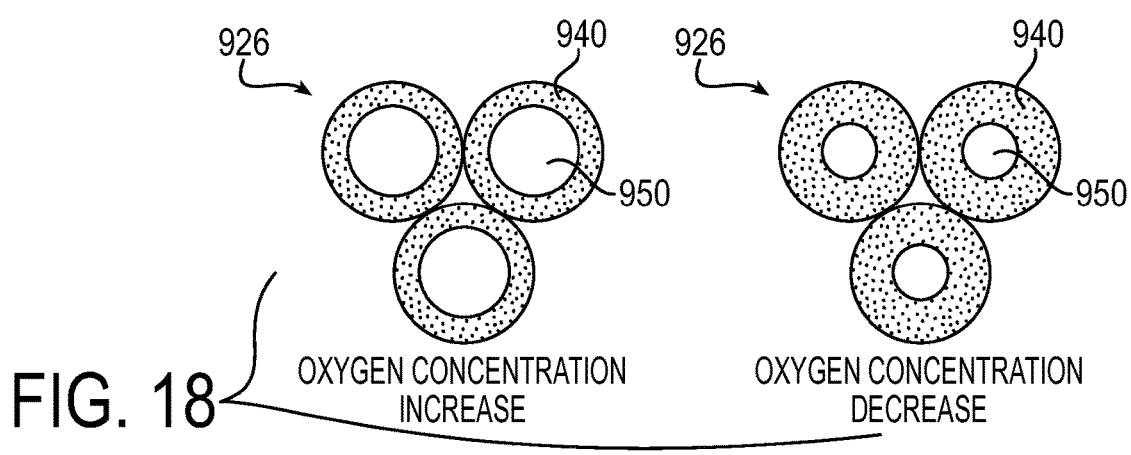
FIG. 18 — OXYGEN CONCENTRATION INCREASE / OXYGEN CONCENTRATION DECREASE

INERTING AND VENTING SYSTEM

RELATED APPLICATIONS

This application claims the benefit of U.S. Provisional Application No. 62/404,268 filed Oct. 5, 2016, which is hereby incorporated herein by reference.

FIELD OF INVENTION

This application relates generally to systems and methods for inerting and venting a volume of space, and more particularly to systems and methods for controlling pressure and uniformity and level of oxygen concentration in an ullage space of a fuel tank while being connected to the ambient atmosphere via a vent system.

BACKGROUND

Aircraft fuel tank inerting and venting systems are used as means to prevent fuel tank explosions by reducing the oxygen concentration in the ullage. This reduces the likelihood of an explosion even if fuel vapors and ignition source are present, as the low oxygen concentration cannot sustain flame propagation or an explosion. A typical aircraft inerting and venting system may consist of a means to generate nitrogen enriched air (NEA), a means to control the oxygen concentration of NEA, and a means to distribute the NEA in the fuel tank ullage during all phases of the flight.

For some inerting and venting systems, there remain various shortcomings, drawbacks, and disadvantages relative to certain applications. Some inerting and venting systems inject NEA directly into fuel tank compartments through NEA injectors with the aim to a) deliver a certain amount of NEA mass flow at a given oxygen concentration into the fuel tank depending on aircraft operating conditions, and b) achieve gas mixing within the ullage space. U.S. Pat. Nos. 7,204,868, 7,442,230; and 8,777,165 disclose injecting NEA either directly into the fuel tank vent lines to inert ambient air prior to flowing into the fuel tank during aircraft descend, instead of reducing the oxygen concentration of the inflowing vent air after it has entered the fuel tank via fuel tank internal NEA jets. The former approach prevents excessively high oxygen concentrations and assures a more uniform gas mixture in the ullage space, reducing the likelihood oxygen concentration "hot" spots, at the same amount of admitted NEA. In U.S. Pat. No. 8,074,932, NEA from the inerting and venting system is also admitted to the vent air flow upstream of the fuel tank, however, in this case it is not injected directly into the vent lines but admitted to a mixing chamber added to the aircraft vent system between the aircraft surge tank and the wing tanks. NEA flow is regulated via valves which can be controlled by oxygen sensors in the ullage space.

Thus, while the afore mentioned inerting and venting systems describe ways to manage oxygen concentration within an aircraft fuel tank through controlled admission of NEA into the ullage space or into the tank vent system or a mixing chamber as part of the vent system, these systems do not address the effect of the NEA flow on tank pressure and vice versa directly. The inerting and venting systems do not provide simultaneous or direct passive control of both mass flow and oxygen concentration of mass flow entering the full tank ullage space, nor across different fuel tank compartments where differing ullage space conditions may be present. Existing systems and methods merely regulate and control tank pressure by the vent line system independently for example via a climb-and-dive valve (closed vent line system) and the residing pressure conditions, while the NEA flow is actively controlled for example by oxygen sensors in the fuel tank ullage space. There is no provision for passively adjusting usage of available NEA flow across different fuel tank compartments based on for example changing oxygen concentration in the respective ullage spaces or in the NEA supply.

Accordingly, there remains a need for further contributions in this area of technology.

SUMMARY OF INVENTION

The application relates to aircraft inerting and venting systems and methods that a) enrich ambient air flowing into an aircraft fuel tank with inert gas such as NEA (Nitrogen Enriched Air), in order to assure that the oxygen concentration anywhere in the fuel tank does not exceed a predefined limit, and b) assure that the pressure differential between the fuel tank ullage space and the ambient remains within predefined limits.

The aircraft inerting and venting system mitigates the possibility of oxygen concentration overshoots in the fuel tank particularly during aircraft descend, by mixing the inert gas flow during its high flow mode with the outside vent air flow by means of an inert gas and vent air control assembly at, for example, locations where the aircraft vent lines join the various fuel tank compartments. A mixer mixes the air vent flow with a suitable controlled amount of inert gas flow in a coflowing manner to assure that the mixture of air/inert gas into the fuel tank or fuel tank compartment to which it is connected is below an allowed value based on specified flammability limits. In addition, the aircraft inerting and venting system, and more particularly a valve adjuster thereof, controls the fuel tank compartment pressure by suitable regulation of the mass flow of vent air and admitted inert gas flow within the aircraft inerting and venting system, so that no other flow control mechanism elsewhere (in the inerting system or vent line system) is needed.

According to one aspect of the invention, an inerting and venting system for an aircraft includes a tank containing fluid to be inerted; a mixer including an operating flow path and a mixing flow path; a vent line fluidly connecting ambient atmosphere to the operating flow path of the mixer; and an inert gas line fluidly connecting an inert gas source to the mixing flow path of the mixer. The mixing flow path and the operating flow path are arranged in a coflowing configuration such that ambient air communicated by the operating flow path mixes in a coflowing manner with inert gas communicated by the mixing flow path and the coflowed mixture is directed into the tank.

Embodiments of the invention may include one or more of the following additional features separately or in combination.

The mixer may be connected at an interface of the tank and the vent line such that the resulting coflowed mixture is directly discharged into the tank.

The mixing flow path may include one or more nozzles that inject the inert gas into the ambient air communicated by the operating flow path.

The mixing flow path may include one or more nozzles and the ambient air communicated by the operating flow path may entrain the inert gas from the one or more nozzles, or vice versa, and the entrained mixture is directed into the tank.

The mixing flow path may have a flow axis that is disposed coaxially relative to a flow axis of the operating flow path.

The mixing flow path may have a flow axis that is disposed at an oblique angle relative to a flow axis of the operating flow path.

The inert gas line may be a high flow line, and the system may further include a low flow inert gas line between the inert gas source and the tank.

The tank may include a plurality of fuel compartments, and the system may further include a mixer associated with each fuel compartment, and the mixer associated with each respective fuel compartment may be located so as to control the flow of inert gas from the inert gas line into the fuel compartment.

A portion of the vent line and inert gas line in at least one fuel compartment may be integrated into a wall of the fuel compartment, and mixers may be distributed along the tank wall surface in the respective fuel compartments to provide distributed control of ambient air and inert gas into the fuel compartments.

The inerting and venting system may be a closed loop, passive, localized control system.

According to another aspect of the invention, an inerting and venting system for an aircraft includes a tank containing fluid to be inerted; a first valve for controlling flow of vent air from ambient atmosphere to the tank; a second valve for controlling flow of inert gas from an inert gas source to the tank; and a valve adjuster configured to passively adjust the first and second valves in response to a pressure differential between the ambient atmosphere and the tank.

Embodiments of the invention may include one or more of the following additional features separately or in combination.

The valve adjuster may be mechanically coupled to the first and second valves to simultaneously and passively adjust the first and second valves.

The second valve may be mechanically coupled to the first valve so that flow control of inert gas flow through the second valve is proportional to flow control of vent air through the first valve in response to the pressure differential between the ambient atmosphere and the tank.

The valve adjuster may include an actuator responsive to oxygen concentration in the inert gas of the tank ullage gas to change the ratio of the controlled flow of vent air and inert gas admitted through the respective first and second valves.

The valve adjuster may include an electronic oxygen sensor for sensing oxygen concentration, and an electronic controller that controls movement of the actuator based on the sensed oxygen concentration.

According to another aspect of the invention, an inerting and venting system for an aircraft includes a tank containing fluid to be inerted; a first valve for controlling flow of vent air from ambient atmosphere to the tank; a second valve for controlling flow of inert gas from an inert gas source to the tank; and a valve adjuster configured to passively adjust the ratio of the controlled flow of vent air and inert gas admitted through the respective first and second valves based on one or more of an oxygen concentration in an inert gas line communicating inert gas from the inert gas source to the second valve and an oxygen concentration in an ullage space of the tank.

Embodiments of the invention may include one or more of the following additional features separately or in combination.

The valve adjuster may include an actuator responsive to oxygen concentration in the inert gas to proportionately change the controlled flow of vent air and inert gas by the respective first and second valves.

The actuator may include a stimuli sensitive material actuator.

The actuator may include an amplifier that amplifies volumetric/length changes in stimuli sensitive material of the stimuli sensitive material actuator.

The actuator may include a stimuli sensitive polymer actuator.

The actuator may include a stimuli sensitive gel actuator.

The actuator may expand and contract in response to respective increase and decrease in oxygen concentration.

The expansion and contraction may respectively increase and decrease an effective flow area of the second valve.

The expansion and contraction may respectively increase and decrease the proportion of inert gas flow admitted by the second valve relative to vent air flow admitted by the first valve.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention.

FIG. 17 is a schematic diagram of an inert gas and vent air control assembly according to another embodiment of the invention.

FIG. 18 is a cross-section view of a portion of the FIG. 18 assembly as viewed from the plane 18-18 in FIG. 17.

DETAILED DESCRIPTION

Figure 1:
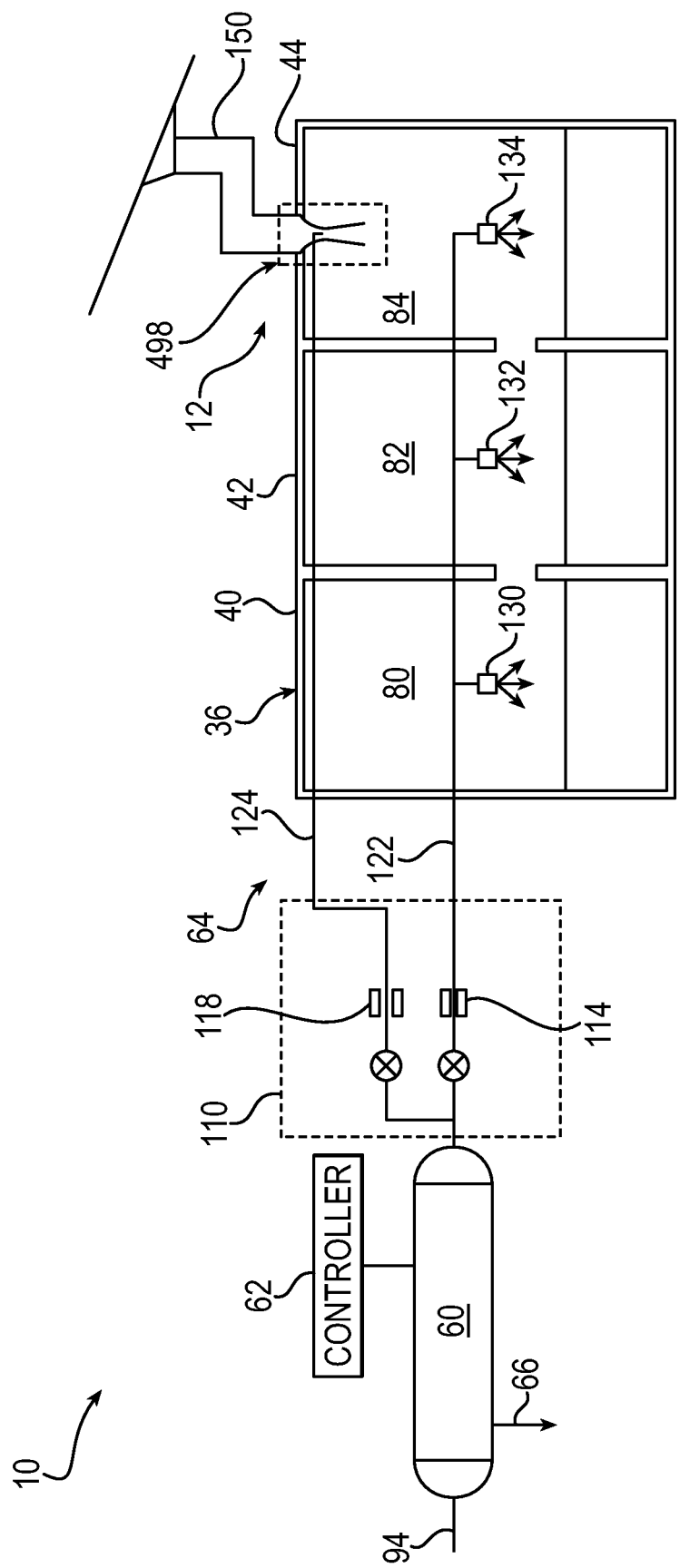
FIG. 1 is a schematic diagram of an aircraft inerting and venting system in accordance with an embodiment of the invention.

While the present invention can take many different forms, for the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications of the described embodiments, and any further applications of the principles of the invention as described herein, are contemplated as would normally occur to one skilled in the art to which the invention relates.

Figure 2:
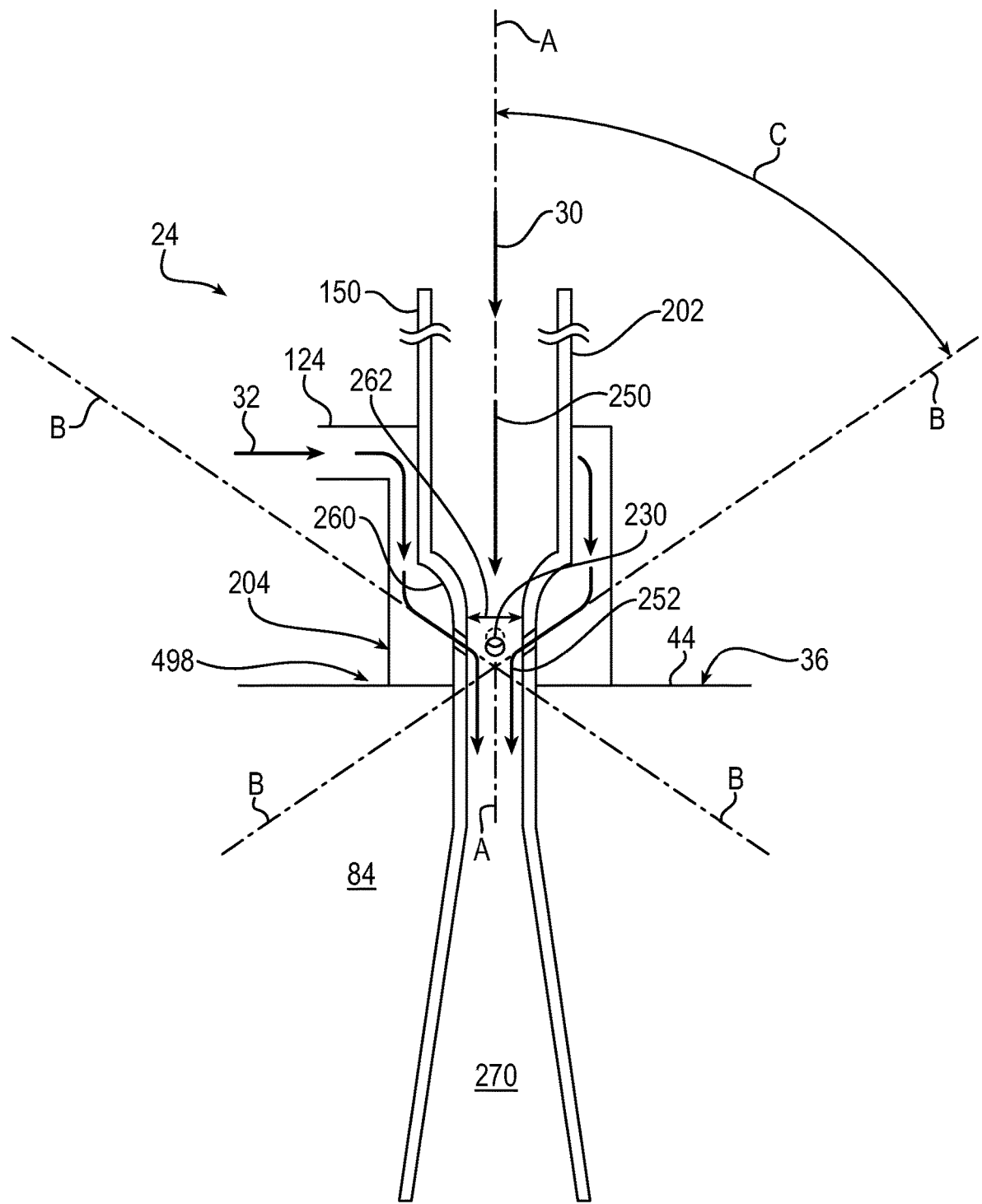
FIG. 2 is a schematic diagram of a mixer in accordance with an embodiment of the invention.
Figure 3:
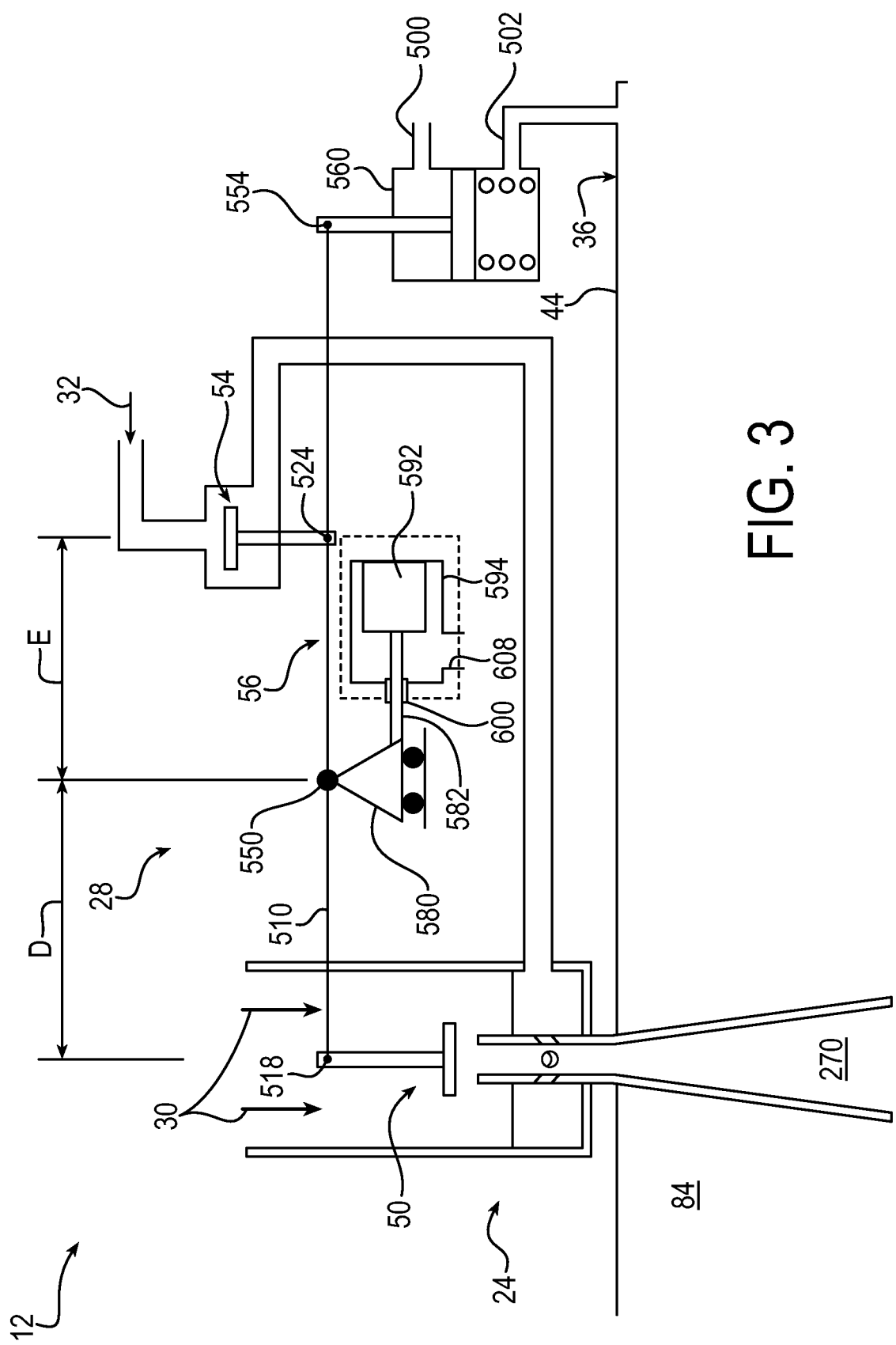
FIG. 3 is a schematic diagram of an inert gas and vent air control assembly in accordance with an embodiment of the invention.

FIGS. 1-3 show an aircraft inerting and venting system 10 and an inert gas and vent air control assembly 12 thereof in accordance with the invention. The inert gas and vent air control assembly 12 includes a mixer 24, an example of which is shown in FIG. 2, and a valve adjuster 28, an example of which is shown in FIG. 3. As will be described in greater detail below, the mixer 24 is configured to arrange a flow of vent air 30 and a flow of inert gas 32 in a coflowing manner before admitting the coflowed mixture into a fuel tank 36 in which fluid is to be inerted, or more particularly into a compartment 44 of the fuel tank 36 in the FIG. 1 aircraft inerting and venting system 10. The valve adjuster 28, which may be integrated into the mixer 24 or disposed upstream therefrom, is configured to passively adjust a vent air valve 50 and an inert gas valve 54 in response to a pressure differential between ambient atmosphere and the fuel tank 36 or more specifically fuel tank compartment interior 84. As will also be described in greater detail below, the valve adjuster 28 may be equipped with a proportional control actuator 56 or a stimuli sensitive material actuator that is responsive, either passively or actively, to oxygen concentration changes in the ullage space 84 of the fuel tank compartment 44 or in the inert gas line to control flow of vent air by the vent air valve 50 proportionally relative to control of flow of inert gas by the inert gas valve 54.

The aircraft fuel tank 36 of the FIG. 1 aircraft inerting and venting system 10 is divided into three fuel tank compartments 40, 42, 44. The aircraft inerting and venting system 10 includes an inert gas generator 60 to generate for example nitrogen enriched air (also referred to herein as NEA), an oxygen concentration controller 62 to control the oxygen concentration of the NEA, and an inert gas distributor 64 to distribute the NEA in the fuel tank ullage spaces 80, 82, 84 of the tank compartments 40, 42, 44 during all phases of the flight of an aircraft. In one form, the inert gas generator 60 may generate NEA, sometimes referred to as oxygen depleted air (or ODA), by means of an On Board Inert Gas Generation System (OBIGGS) that, for example, passes cooled engine bleed air or cabin air 94 through a bundle of fibers that strip the oxygen molecules from the air, resulting in the NEA. Oxygen enriched air is expelled via a port 66. Of course, other means may be used to generate the NEA, for example, surface catalytic reactions.

A valve 110 such as a dual flow shut-off valve (DFSOV) controls the concentration and flow of the NEA into the fuel tank compartments 40, 42, 44. The illustrative valve 110 operates in a low flow mode for example via a low flow orifice 114 and a high flow mode for example via a high flow orifice 118. The illustrative valve 110 operates in the low flow mode for example during aircraft ground operation, climb, cruise and taxi, to controllably provide via the low flow orifice 114 a relatively low NEA flow with relatively low oxygen concentration, and in the high flow mode for example during aircraft descend to provide via the high flow orifice 118 relatively high NEA flow with relatively high oxygen concentration. The illustrative inert gas distributor 64 includes a low flow inert gas line 122 and a high flow inert gas line 124 to fluidly communicate the respective low flow NEA and high flow NEA to the fuel tank compartments 40, 42, 44. Injectors 130, 132, 134 are provided along discrete locations of the low flow inert gas line 122 to disperse the low NEA into the respective tank compartments 40, 42, 44. The inert gas and vent air control assembly 12 is fluidly connected to the high flow inert gas line 124 to disperse the high NEA flow into the tank compartment 44. Other configurations of the lines 122, 124 and inert gas and vent air control assembly 12 are also contemplated, as described herein.

The three tank compartments 40, 42, 44 may be sized and configured to provide for example structural rigidity to the wings of the aircraft, or to reduce fuel sloshing and provide a minimum amount of usable fuel in case of wing damage due to engine rotor burst, for example. The FIG. 1 aircraft inerting and venting system represents a traditional "open vent system" architecture in the sense that, in the absence of the inert gas and vent air control assembly 12, there is free flow of ambient air in and out of the fuel tank compartments 40, 42, 44 of the fuel tank 36 by connecting the compartments 40, 42, 44 to the ambient atmosphere by a fuel tank vent line 150. Open vent type systems are commonly used in commercial aircraft.

The aircraft inerting and venting system 10 provides the NEA to maintain the oxygen concentration in the fuel tank ullage spaces 80, 82, 84 below a certain limit. As an aircraft descends (or climbs) a pressure difference between the interior of the fuel tank 36 and ambient atmosphere develops. The pressure difference drives flow through the vent line 150. The aircraft inerting and venting system 10 coordinates ambient air flow through the vent line 150 with NEA flow admitted to the fuel tank compartments 40, 42, 44 via the inert gas distributor 64 to achieve adequate low oxygen concentration within the fuel tank ullage spaces 80, 82, 84, while also maintaining the pressure difference between the fuel tank interior and exterior within acceptable limits.

A typical aircraft mission consists of five phases, namely: ground operations, climb, cruise, descent and taxi. During ground operation, climb, and cruise, the valve 110 is commanded to low flow mode. The NEA delivered to the fuel tank compartments 40, 42, 44 has low oxygen concentration, which allows the oxygen concentration to be reduced from for example 21% oxygen to about 2% oxygen concentration at the end of cruise. During the descent part of the mission, ambient air streams into the fuel tank 36 via the vent line 150, and the valve 110 is commanded to high flow mode, in which case the aircraft inerting and venting system 10 delivers high NEA flow at relatively high oxygen concentration. The aircraft inerting and venting system 10 is designed to assure that fuel tank pressure relative to ambient pressure is maintained within acceptable limits, and to assure that the ratio of admitted NEA and ullage air maintains the oxygen concentration within the ullage spaces 80, 82, 84 of the fuel tank compartments 40, 42, 44 below allowable limits.

Figure 4:
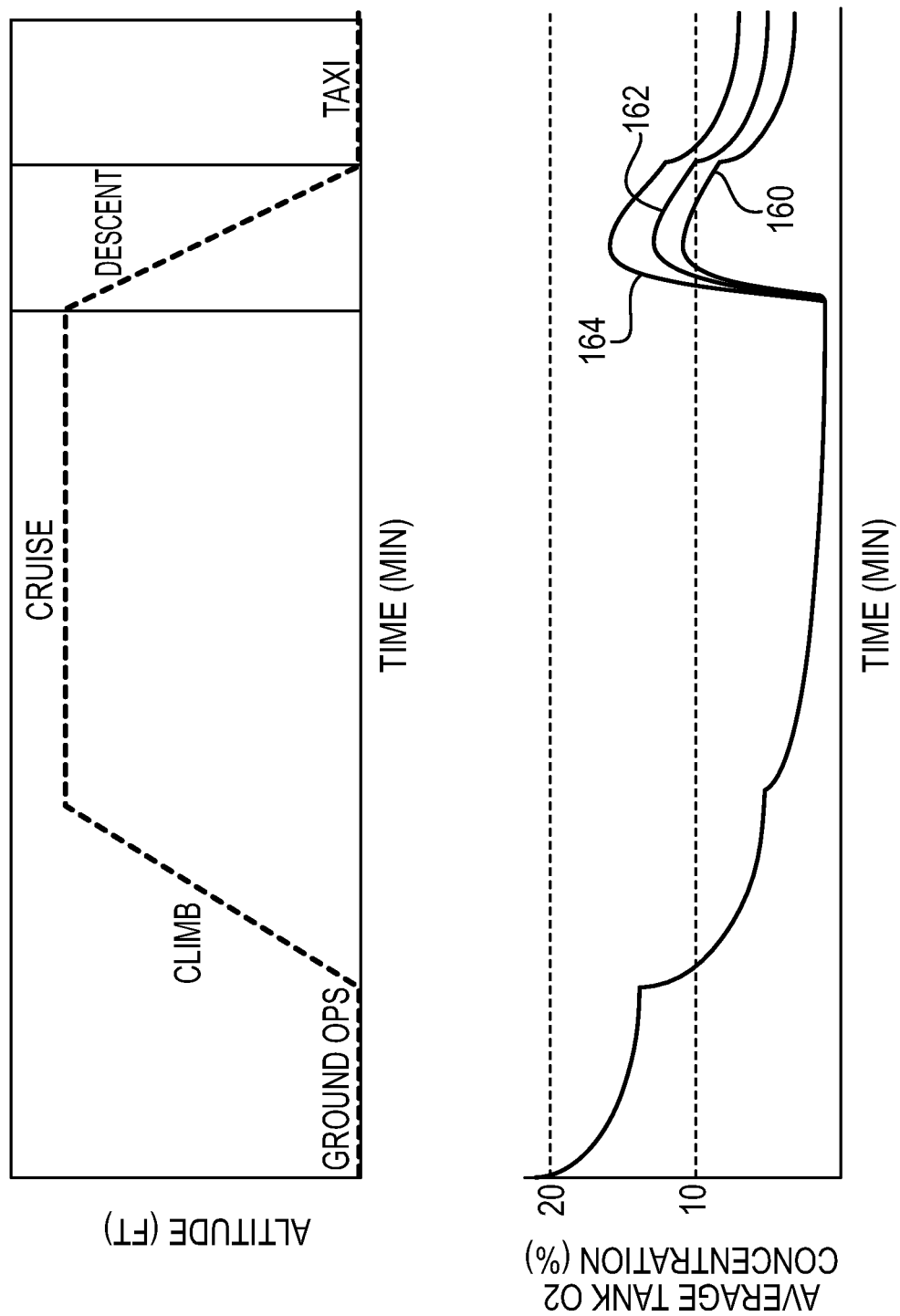
FIG. 4 is a chart showing altitude versus time for a typical aircraft mission, and a corresponding chart showing average tank oxygen concentration versus time for a typical aircraft mission and various different tank compartments.
Figure 5:
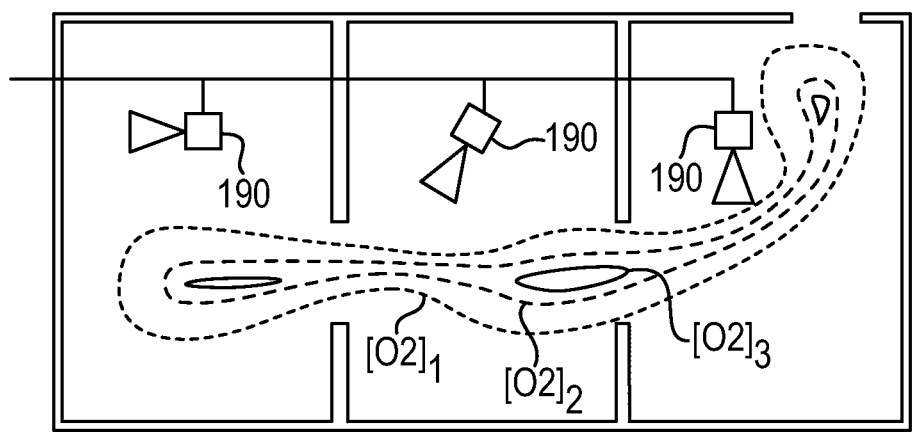
FIG. 5 is a schematic diagram showing isosurfaces of instantaneous oxygen concentrations across fuel tank compartments of a prior system.

The inventors have found that in prior inerting and venting systems, as ambient air is admitted into a fuel tank there is a large variation in oxygen concentration between a fuel tank compartment where a vent air line is located, and a fuel tank compartment that is farthest from the vent air line. Also, for some prior inerting and venting systems, the inventors have found that within a given compartment there may be considerable variations in oxygen concentration. FIG. 4 shows the average oxygen concentration in a multiple compartment fuel tank of a prior inerting and venting system during a typical aircraft mission, where a fuel tank compartment that is farthest from the vent air line is identified at reference numeral 160, an intermediate fuel tank compartment is identified at reference numeral 162, and a fuel tank compartment where a vent air line is located is identified at reference numeral 164. The inventors found that even though the average oxygen concentration within the fuel tank compartments of a prior system may be within acceptable limits, the oxygen concentration in the compartment 164 where ambient air is admitted can be relatively higher than in other compartments and outside of acceptable limits, notwithstanding the use of NEA jets to promote mixing of the NEA and incoming air within the compartments. The inventors have also found that the oxygen concentration within a single fuel tank compartment of a prior system can fluctuate considerably, so that while the average oxygen concentration might be below the acceptable/flammability limit, this might not be accurate locally within the compartment. FIG. 5 shows instantaneous oxygen concentrations (represented by isosurfaces of oxygen concentration) across fuel tank compartments of such a prior system, where [O2]3 is a relatively higher oxygen concentration than [O2]2, and [O2]2 relatively higher than [O2]1. The inventors found, as shown in FIG. 5, that while average oxygen concentration across the compartments might be acceptable, local distributions of oxygen concentration in each compartment might be relatively higher and unacceptable, again, even with NEA jets 190 to promote mixing of the NEA and incoming air within the compartments.

The mixer 24 and valve adjuster 28 of the inert gas and vent air control assembly 12 of FIG. 1 each promote improved control and distribution of NEA flow into the fuel tank compartments 40, 42, 44. FIG. 2 shows the mixer 24 in greater detail. The mixer 24 includes a vent pipe section 202 connected to the fuel tank vent line 150, and a high flow NEA pipe section 204 connected to the high flow inert gas line 124, in the FIG. 1 embodiment the NEA line 124. The NEA pipe section 204, in turn, is fluidly connected to a plurality of nozzles 230. The vent pipe section 202 communicates ambient air along an operating flow path 250, and the NEA pipe section 204 and nozzles 230 communicate high flow NEA along a mixing flow path 252. As shown in FIG. 2, the vent line 150 fluidly connects ambient atmosphere to the operating flow path 250, and the high flow inert gas line 124 fluidly connects the inert gas source 60 (FIG. 1) to the mixing flow path 252. The mixing flow path 252 and the operating flow path 250 are arranged in a coflowing configuration such that ambient air communicated by the operating flow path 250 mixes in a coflowing manner with inert gas communicated by the mixing flow path 252, and the coflowed mixture is directed into the fuel tank 36. The mixer 24 efficiently mixes the inflowing NEA with the inflowing vent air in a coflowing configuration. As will be appreciated, the coflowing configuration optimally takes advantage of the dynamic head of both the vent air flow and the NEA flow for both vent air flow and NEA flow mixing and mixing of the resulting mixture with the adjacent tank ullage space. This is advantageous over, for example, a mixing chamber where the dynamic head of the vent air flow and the NEA is not optimally used.

In the FIG. 2 mixer, the plurality of nozzles 230 are located at the periphery of the operating flow path 250. The nozzles 230 may be equally circumferentially disposed around the operating flow path 250, as shown in FIG. 2, or unequally spaced, for example, to accommodate volumetric constraints of the tank 36. The operating flow path 250 and mixing flow path 252 are disposed along respective flow axes A-A and B-B, and in the FIG. 2 embodiment, the mixing flow axis B-B is disposed at an oblique angle C relative to the operating flow axis A-A. The oblique angle C may be any suitable angle to enhance efficient mixing of the NEA with the ambient air, and in the illustrative embodiment is about 45 degrees. The vent pipe section 202 may include a converging section 260 to, for example, increase the velocity of the ambient air as it passes therethrough. The nozzles 230 may be positioned at the throat 262 of the converging section 260, as shown, to increase the mixing action of the NEA and ambient air streams. The nozzles 230 may inject NEA flow into the ambient air flow of the operating flow path 250 and/or entrain ambient air flow of the operating flow path 250, or vice versa, in a coflowing fashion, thereby imparting a mixing action between the ambient air flow and NEA flow. In one form, the nozzles 230 and vent pipe section 202 may form an eductor type nozzle. As noted, the coflowing configuration takes advantage of the mixing of coflowing without compromising the dynamic head of the ambient vent flow or the NEA mass flow. The resulting air-NEA mixture 270 is discharged into the fuel tank compartment 44 mixing with the ullage gases of its interior 84.

Figure 6:
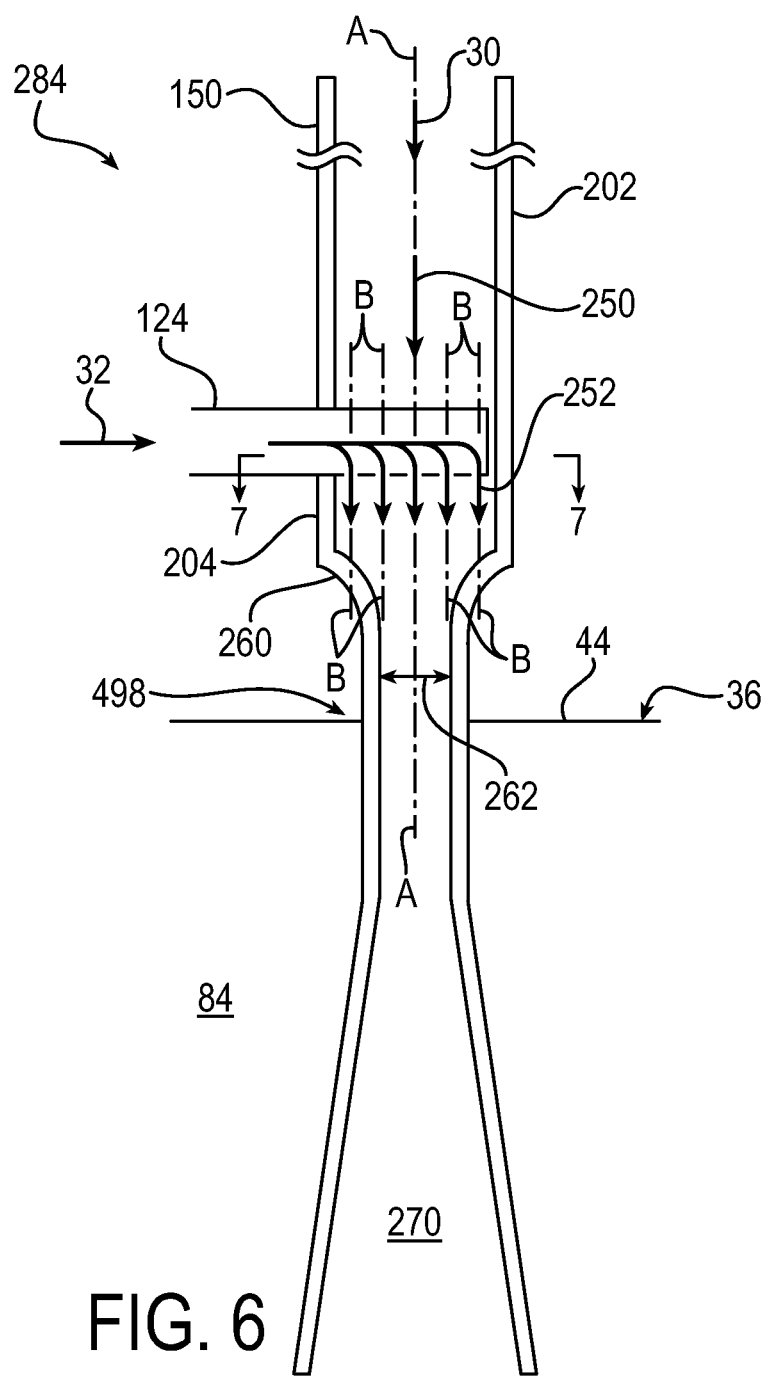
FIG. 6 is a schematic diagram of a mixer in accordance with another embodiment of the invention.
Figure 10:
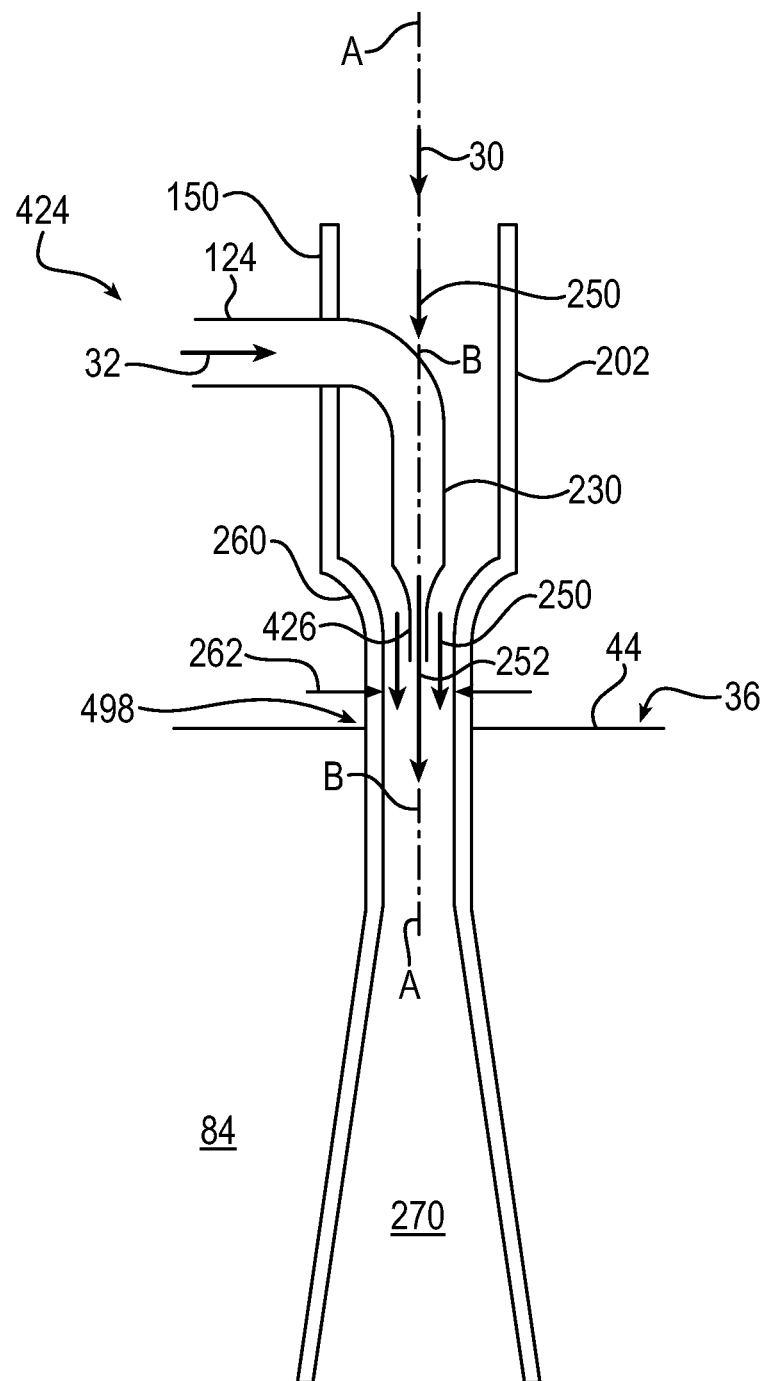
FIG. 10 is a schematic diagram of a mixer in accordance with another embodiment of the invention.
Figure 11:
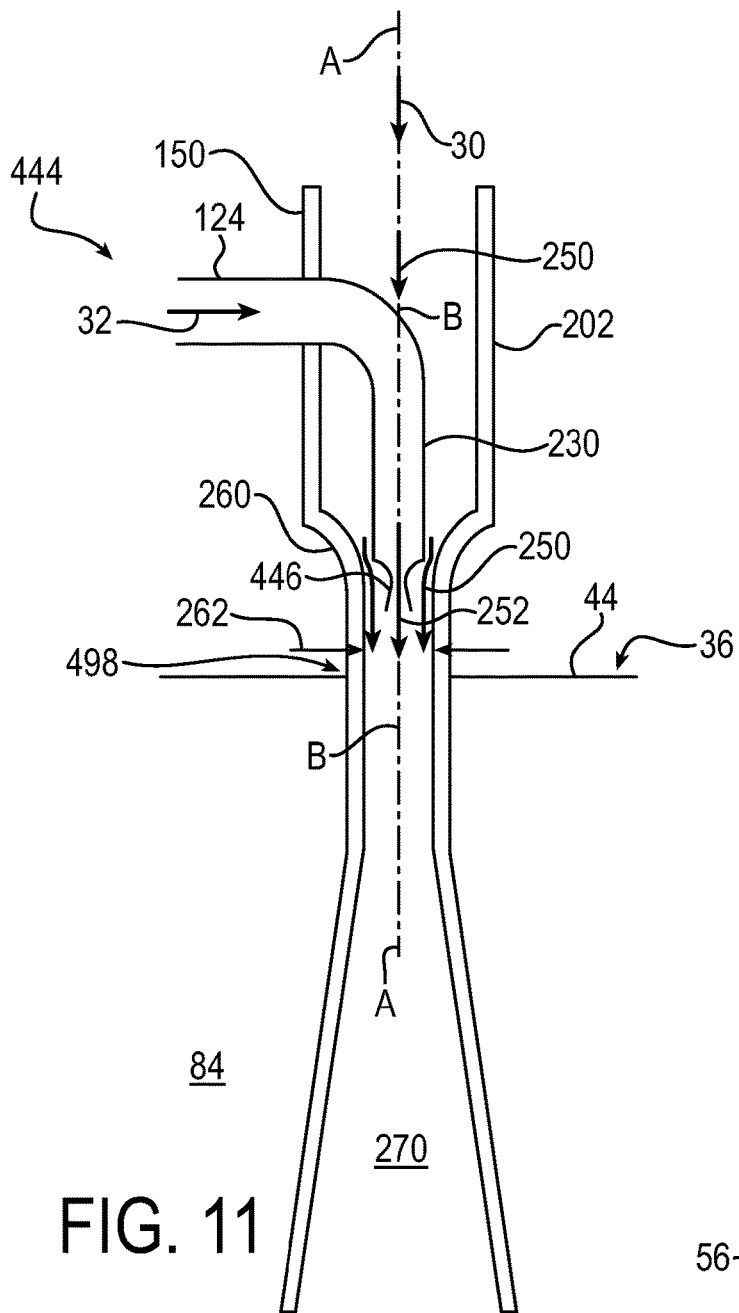
FIG. 11 is a schematic diagram of a mixer in accordance with another embodiment of the invention.

The mixer 24 need not be limited to the configuration of FIG. 2, and other embodiments are contemplated. FIGS. 6, 10 and 11 show respective mixers 284, 424, 444 according to other embodiments of the invention. The mixers 284, 424, 444 in FIGS. 6, 10 and 11 are in many respects similar as the above-referenced FIG. 2 mixer 24, and consequently the same reference numerals are used to denote structures corresponding to similar structures in the FIG. 2 mixer 24. In addition, the foregoing description of the FIG. 2 mixer 24 is equally applicable to the mixers 284, 424, 444 of FIGS. 6, 10 and 11 except as noted below. Moreover, it will be appreciated upon reading and understanding the specification that aspects of the mixers 24, 284, 424, 444 may be substituted for one another or used in conjunction with one another where applicable.

Figure 7:
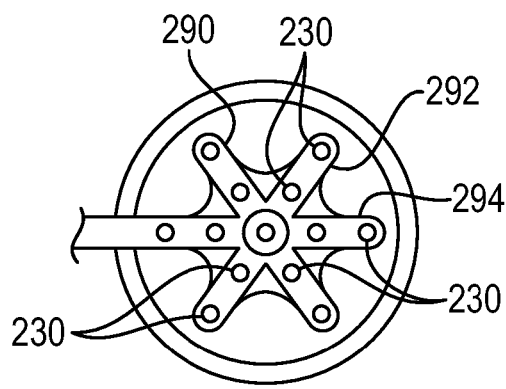
FIG. 7 is a cross-section view of the FIG. 6 mixer as viewed from the plane 7-7 in FIG. 6.

In the FIG. 6 mixer 284, the plurality of nozzles 230 are not peripherally disposed relative to the operating flow path 250, but rather disposed within the operating flow path 250. As shown in FIG. 7, the nozzles 230 span across the diameter of the vent pipe section 202 along three different angularly spaced rows 290, 292, 294, in a "showerhead type" fashion. In another form, the mixer 284 may have a single row of nozzles, or two rows, or greater than three rows. Also, the nozzles do not have to be circular but can be of different shapes and elongated along the spaced rows, thereby approximating a lobed nozzle or mixer geometry. The mixing flow axis B-B of the nozzles 230 as a group (or "showerhead") is disposed coaxially relative to the operating flow axis A-A. More particularly, the mixing flow axis B-B of the centrally located nozzle 230 is coaxial to the operating flow axis A-A, while the mixing flow axes B-B of the nozzles 230 surrounding the centrally located nozzle 230 are axially parallel to the operating flow axis A-A. The vent pipe section 202 may include a converging section 260 to, for example, increase the velocity of the ambient air as it passes therethrough. The nozzles 230 may be positioned upstream of the throat 262 of the converging section 260, as shown, so that the NEA and ambient air coflow prior to the throat 262 section and together have their velocities increased by the converging section 260, thereby increasing the mixing action of the NEA and ambient air streams. The nozzles 230 may inject NEA flow into the ambient air flow of the operating flow path 250 and/or entrain ambient air flow of the operating flow path 250, or vice versa, in a coflowing fashion, thereby imparting a mixing action between the ambient air flow and the NEA flow. In one form, the nozzles 230 and vent pipe section 202 may form an eductor type nozzle. As with the FIG. 2 mixer 24, the FIG. 6 mixer 284 takes advantage of the mixing of coflowing without compromising the dynamic head of the ambient vent flow or the NEA mass flow. The resulting air-NEA mixture 270 is discharged into the fuel tank compartment 44 where it mixes with the ullage gases of its interior 84.

Figure 8:
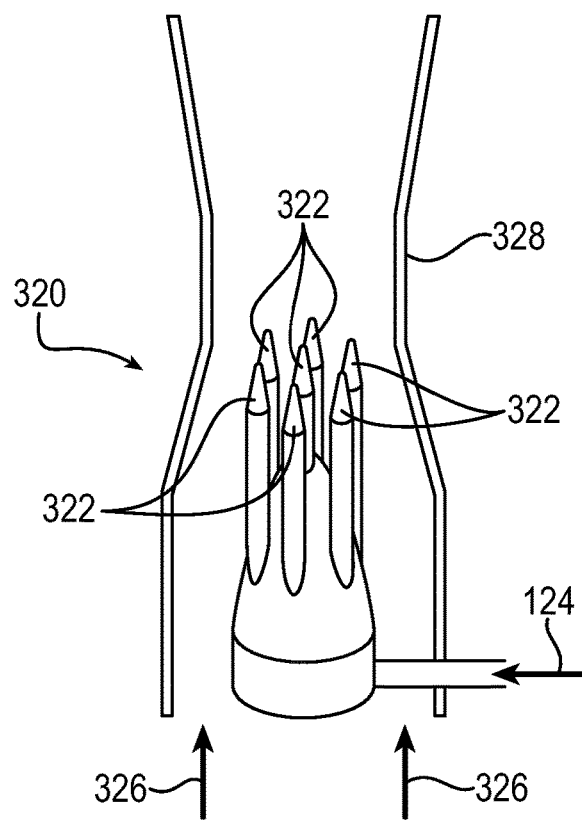
FIG. 8 is a perspective view of multiple primary nozzles for use in a mixer in accordance with the invention.
Figure 9:
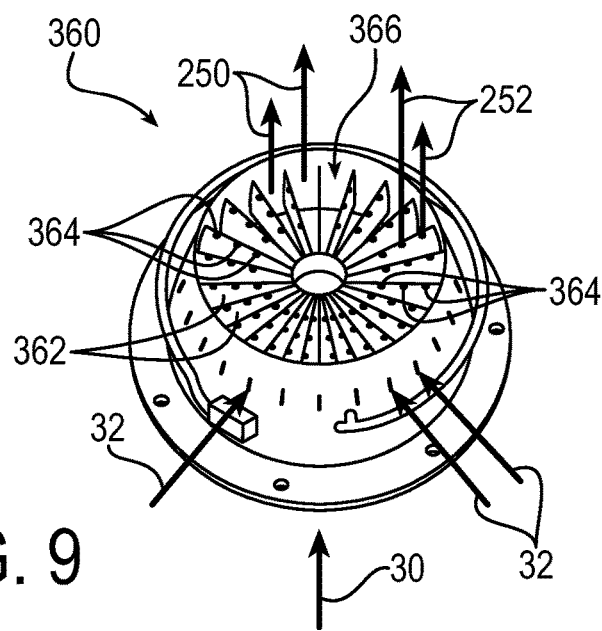
FIG. 9 is a perspective view of multiple primary nozzles, more particularly having elliptical section vanes with multiple holes, for use in a mixer in accordance with the invention.

FIGS. 8 and 9 show different devices by which the arrangement of the plurality of nozzles 230 in the mixers 24, 284 of FIGS. 2 and 6 may be realized. In the FIG. 8 device 320, six NEA nozzles 322 surround a centrally located NEA nozzle 322 in axially parallel relationship, while air passage 326 is fluidly communicated around the seven NEA nozzles 322 via a converging diverging converging nozzle 328 the central axis of which is axially parallel to the axis of the NEA nozzle arrangement, resulting in a coflowing arrangement of the NEA flow and air flow. In the FIG. 9 device 360, a plurality of circumferentially spaced elliptical section vanes 362 each having a plurality of radially spaced NEA holes 364 at their trailing edges, are provided within an axially parallel ambient air passage 366. NEA flow is admitted through the vanes 362 and out from the NEA holes 364 and into the air passage 366 in a coflowing manner.

FIGS. 10 and 11 show mixers 424 and 444 that have a single NEA nozzle 230. In the FIG. 10 mixer 424, the nozzle 230 has a convergent elliptical section 426, while in the FIG. 11 mixer 444, the nozzle 230 has a convergent-divergent elliptical section 446. The mixing flow axis B-B of the nozzle 230 is disposed coaxially relative to the operating flow axis A-A of the mixers 424, 444. The vent pipe section 202 may include a converging section 260 to, for example, increase the velocity of the ambient air as it passes therethrough. The sections 426 or 446 of the nozzle 230 may be positioned at the throat 262 of the converging section 260, as shown, to increase the mixing action of the NEA and ambient air streams. In each mixer 424, 444, the nozzle 230 may inject NEA flow into the ambient air flow of the operating flow path 250 and/or entrain ambient air flow of the operating flow path 250, or vice versa, in a coflowing fashion, thereby imparting a mixing action between the ambient air flow and the NEA flow. In one form, the nozzles 230 and vent pipe section 202 may form an eductor type nozzle. As with the mixers 24, 284 of FIGS. 2 and 6, the mixers 424, 444 take advantage of the mixing of coflowing without compromising the dynamic head of the ambient vent flow or the NEA mass flow. The resulting air-NEA mixture 270 is discharged into the fuel tank compartment 44 where it mixes with the ullage gases of its interior 84.

As shown in FIG. 1, the FIG. 2 mixer 24, and similarly the mixers 284, 424, 444 in FIGS. 6, 10 and 11, may be installed at the tank/vent line interface 498, for example, at the inside of the tank wall as shown in FIG. 1, the outside of the tank wall as shown in FIGS. 2, 6, 10 and 11, or partially at the inside wall and partially at the outside wall. By mounting the mixer at the tank/vent line interface, the momentum of the mixing NEA and ambient air stream and the resulting expanding jet imparts a mixing action with the existing gases in the ullage space 84. It will be appreciated, of course, that the mixer 24, 284, 424, 444 can be mounted at a location upstream from the tank/vent line interface or even downstream from the tank/vent line interface, for example, where volumetric or other design constraints so dictate. As such, the mixer can be mounted to the vent line or to internal tank structure.

Reference is now made to FIG. 3 again, which shows the valve adjuster 28 in greater detail. The valve adjuster 28 is mechanically coupled to the vent air valve 50, which controls flow of vent air 30 from the ambient atmosphere to the tank 36, and to the inert gas valve 54, which controls flow of inert gas 32 from the inert gas source 60 (FIG. 1) to the tank 36. The valve adjuster 28 is configured to passively adjust the vent air valve 50 and the inert gas valve 54 in response to a pressure differential between ambient atmosphere 500 and pressure 502 of the tank 36.

The valve adjuster 28 can be mechanically coupled to the vent air valve 50 and the inert gas valve 54 by means of a mechanical linkage. For example, in the FIG. 3 embodiment, the mechanical linkage includes a lever arm 510, a vent air valve pivot 518 that pivotally connects the lever arm 510 to the vent air valve 50, an inert gas valve pivot 524 that pivotally connects the lever arm 510 to the inert gas valve 54, a proportional control actuator sliding pivot 550 that pivotally and slidably connects the lever arm 510 to the proportional control actuator 56, and a pressure differential actuator pivot 554 that pivotally connects the lever arm 510 to a pressure differential actuator 560.

As atmospheric pressure 500 increases relative to tank pressure 502, for example during a descent phase of the aircraft, the pressure differential actuator 560 urges the pressure differential actuator pivot 554 downward in FIG. 3, which the lever arm 510 translates into downward movement of the inert gas valve pivot 524 and upward movement of the vent air valve pivot 518 as the lever arm 510 pivots about the proportional control actuator sliding pivot 550. The downward movement of the inert gas valve pivot 524 causes the inert gas valve 54 to open or further open, allowing a greater amount of inert gas, for example NEA, to flow through the inert gas valve 54 and to the mixer 24 and tank 36. The upward movement of the vent air valve pivot 518 causes the vent air valve 50 to open or further open, allowing a greater amount of ambient air to flow through the vent air valve 50 and to the mixer 24 and tank 36. As atmospheric pressure 500 decreases relative to tank pressure 502, for example during a climb phase of the aircraft, the pressure differential actuator 560 urges the pressure differential actuator pivot 554 upward in FIG. 3, which the lever arm 510 translates into upward movement of the inert gas valve pivot 524 and downward movement of the vent air valve pivot 518 as the lever arm 510 pivots about the proportional control actuator sliding pivot 550. The upward movement of the inert gas valve pivot 524 causes the inert gas valve 54 to close or approach the closed position, allowing a less amount of inert gas, for example NEA, to flow through the inert gas valve 54 and to the mixer 24 and tank 36. The downward movement of the vent air valve pivot 518 causes the vent air valve 50 to close or approach the closed position, allowing less amount of ambient air or less amount of ullage gas to flow through the vent air valve 50. As atmospheric pressure 500 decreases relative to tank pressure 502, for example during a climb phase of the aircraft, additional one-way valves might be employed to facilitate pressure equilibration between tank pressure 502 and ambient pressure 500, especially at high climb rates.

As will be appreciated, the mechanical linkage of the valve adjuster 28 mechanically couples the vent air valve 50 and the inert gas valve 54 so that the valves 50, 54 adjust simultaneously via the lever arm 510 in response to increases and decreases in the pressure difference between atmospheric pressure 500 and tank pressure 502. Of course, delays can be incorporated into the responses of the valves 50, 54 and/or the pressure differential actuator 560, for example by lost motion mechanisms or the like, so that adjustments in the valves 50, 54 are not simultaneous, or movement in the pressure differential actuator 560 does not simultaneously translate into movement in the valves 50, 54. It will also be appreciated that the vent air valve 50, the inert gas valve 54, and the pressure differential actuator 560, are passively operated components in that their function is driven mechanically by changes in atmospheric pressure 500 and tank pressure 502 rather than electronically by electronic sensors and/or electronic actuators or electronic controllers.

The inert gas valve 54 is mechanically coupled to the vent air valve 50 so that flow control of inert gas flow 32 through the inert gas valve 54 is proportional to flow control of vent air 30 through the vent air valve 50 in response to the pressure differential between the ambient atmospheric pressure 500 and the tank pressure 502. In the FIG. 3 valve adjuster 28, the connection points of the vent air valve pivot 518, the inert gas valve pivot 524, the proportional control actuator sliding pivot 550, and the pressure differential actuator pivot 554, along the lever arm 510 yield the proportional flow control. For example, where the distance D between the vent air valve pivot 518 and the proportional control actuator sliding pivot 550 is the same as the distance E between the proportional control actuator sliding pivot 550 and the inert gas valve pivot 524, the change in flow control of inert gas flow 32 through the inert gas valve 54 due to pressure differential changes will be proportional on a one to one basis to the change in flow control of vent air 30 through the vent air valve 50, assuming the resulting motions of valves 50 and 54 are portional to changes in the effective flow areas through the respective valves. Where the distance D is less than the distance E, the change in flow control of inert gas flow 32 through the inert gas valve 54 due to pressure differential changes will be proportionately greater than the change in flow control of vent air 30 through the vent air valve 50. Likewise, where the distance D is greater than the distance E, the change in flow control of inert gas flow 32 through the inert gas valve 54 due to pressure differential changes will be proportionately less than the change in flow control of vent air 30 through the vent air valve 50.

The FIG. 3 valve adjuster 28 is also configured to passively adjust the vent air valve 50 and inert gas valve 54 based on the oxygen concentration in the ullage space 84 of the tank 36 or the oxygen concentration in the high flow inert gas line 124. This direct passive macroscopic flow control can be achieved by mechanical or fluid mechanical magnification of small-scale volumetric/length changes from stimuli sensitive materials that are sensitive to oxygen concentration, and/or their effects on flow behavior in microfluidic devices. Such stimuli sensitive materials could be microgels containing fluorinated monomer 2,3,4,5,6-pentafluorostyrene (FS) as described by Lei, Zhang, Shi and Zhu (Langmuir 2015, vol. 31, no. 7, pp. 2196-2201; ACS Macro Lett. 2017, no. 6, pp. 515-522) or polymers such as O2 (and CO2) responsive polymer nanoaggregates as described by Zhang and Zhu (ACS Macro Lett., 2014, vol. 3, no. 8, pp. 743-746), which are hereby incorporated herein by reference. Such stimuli sensitive materials could also be compounds of O2 responsive materials driving a physical change of the material which in turn triggers a response of another coupled stimuli responsive material in the form of a volumetric/length change.

The proportional control actuator 56 of the FIG. 3 embodiment utilizes a stimuli sensitive material. The expansion and contraction behavior of the stimuli sensitive material will depend on the properties and geometry of the material. In one form, the stimuli sensitive material may be made up of a stimuli sensitive polymer material. In another form, the stimuli sensitive material may be made up of a stimuli sensitive gel material. The proportional control actuator 56 includes a fulcrum 580 that is pivotally and slidably connected to the lever arm 510 via the proportional control actuator sliding pivot 550. The fulcrum 580 is connected to a rod 582, which in turn is connected to a stimuli sensitive material actuator 592. The stimuli sensitive material actuator 592 is enclosed in a housing 594 that has a sliding support 600 within which the rod 582 can reciprocate and a port 608 in fluid communication with the ullage space 84 of the tank 36 or the high flow inert gas line 124. The sliding support 600 can be in the form of a bore, bushing, linear bearing or the like within which the rod 582 axially slides. Any suitable pipe or conduit structure can be used to fluidly connect the port 608 to the ullage 84 or the high flow inert gas line 124.

Figure 12:
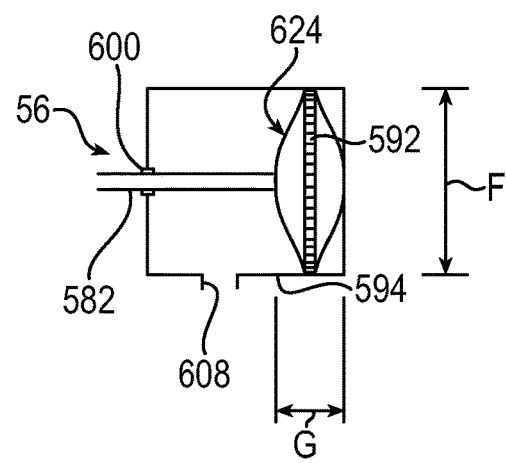
FIG. 12 is a proportional control actuator in accordance with an embodiment of the invention.

An amplifier 624 such as shown in FIG. 12 may be used to amplify volumetric/length changes in the stimuli sensitive material of the stimuli sensitive material actuator 592. In FIG. 12, for example, the amplifier 624 is in the form of an amplification frame 624. The amplification frame 624 converts relatively smaller changes in the volume or length of the stimuli sensitive material in the direction F to relatively larger changes in volume or length in the direction G. As will be appreciated, any suitable means for amplifying the volumetric or length changes in the stimuli sensitive material may be used, the amplification frame 624 being merely one example.

In operation, where the port 608 is in fluid communication with the ullage 84 of the tank 36, an increase in oxygen concentration in the ullage 84 will cause the stimuli sensitive material of the stimuli sensitive material actuator 592 to expand, thereby urging the rod 582 and hence the fulcrum 580 leftward in the FIG. 3 illustration and changing the position of the proportional control actuator sliding pivot 550 so that the distance D is relatively less and the distance E is relatively greater than before the change in oxygen concentration. As such, an increase in atmospheric pressure 500 relative to tank pressure 502 will cause the inert gas valve 54 to allow a proportionately greater amount of inert gas flow than the amount of vent air flow allowed by the vent air valve 50 owing to the change in position of the fulcrum 550. On the other hand, a decrease in oxygen concentration in the ullage 84 will cause the stimuli sensitive material of the stimuli sensitive material actuator 592 to contract, thereby urging the rod 582 and hence the fulcrum 580 rightward in FIG. 3 and changing the position of the proportional control actuator sliding pivot 550 so that the distance D is relatively greater and the distance E is relatively less than before the change in oxygen concentration. As such, a decrease in atmospheric pressure 500 relative to tank pressure 502 will cause the inert gas valve 54 to allow a proportionately less amount of inert gas flow than the amount of vent air flow allowed by the vent air valve 50 owing to the change in position of the fulcrum 550.

The port 608 may alternatively be in fluid communication with the high flow inert gas line 124. As such, the stimuli sensitive material actuator 592 of the valve adjuster 28 responds to oxygen concentration in the high flow inert gas line 124 to proportionately change the controlled flow of vent air 30 and inert gas 32 by the respective vent air valve 50 and inert gas valve 54. The inventors have found that inert gas generators 60 and oxygen concentration controllers 62 may deteriorate over time, resulting in degraded performance. The stimuli sensitive material actuator 592 can compensate for such degraded performance by passively sensing changes in the amount of oxygen concentration in the high flow inert gas line 124 and changing for example via movement in the fulcrum 580 the proportion of admitted vent air 30 and inert gas 32 by the respective valves 50, 54 based on the sensed oxygen concentration changes. The inventors have also found that the inert gas line 124 might receive NEA from various different inert gas sources at different times or at the same time but at varying proportions, thereby providing NEA in the inert gas line 124 at different oxygen concentrations. The stimuli sensitive material actuator 592 can compensate for such variations by passively sensing changes in the amount of oxygen concentration in the high flow inert gas line 124 and changing for example via movement in the fulcrum 580 the proportion of admitted vent air 30 and inert gas 32 by the respective valves 50, 54 based on the sensed oxygen concentration changes.

Figure 13:
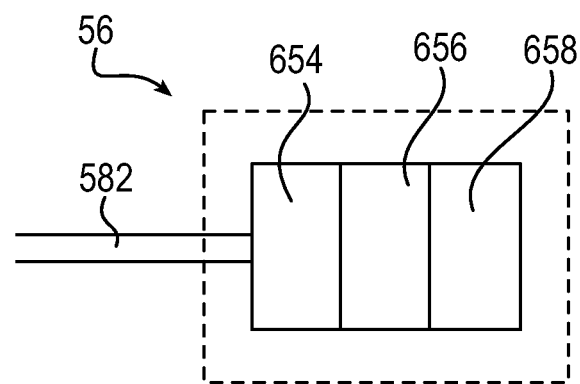
FIG. 13 is a proportional control actuator in accordance with another embodiment of the invention.

The proportional control actuator 56 need not be limited to passive actuation and instead can rely on an active actuation device, a schematic example of which is shown in FIG. 13. In FIG. 13, the proportional control actuator 56 includes an electrochemical oxygen sensor 658 for sensing oxygen concentration (either in the ullage 84 of the tank 36 or in the high flow inert gas line 124), and an electronic controller 656 that controls movement of an electronic actuator 654 based on the sensed oxygen concentration. The electronic controller 656 can use a look-up table, for example, to determine how much the electronic actuator 654 should move the rod 582 based on change in oxygen concentration sensed by the electrochemical oxygen sensor 658.

Figure 14:
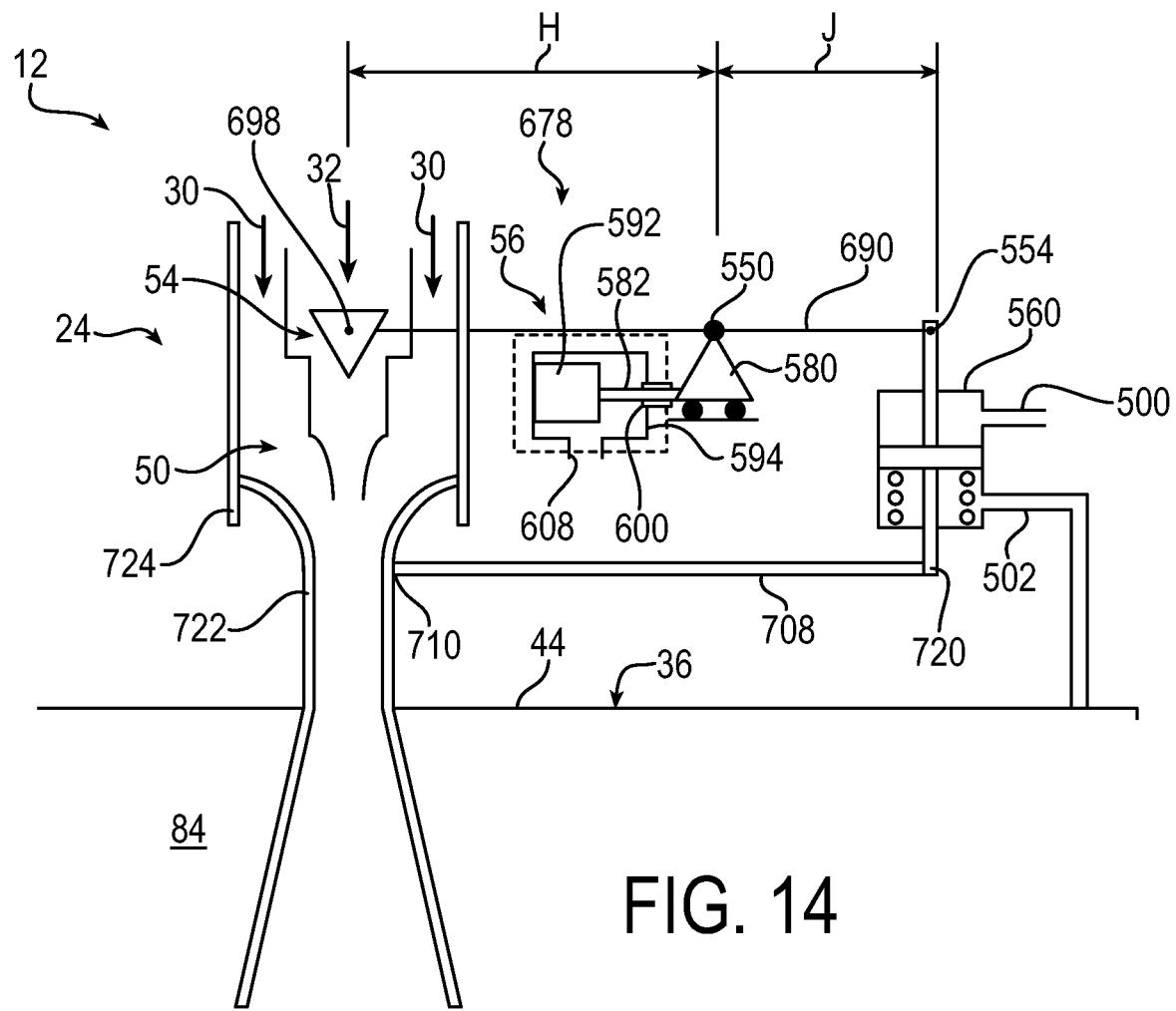
FIG. 14 is a schematic diagram of an inert gas and vent air control assembly in accordance with an embodiment of the invention.

The valve adjuster 28 need not be limited to the configuration of FIG. 3, and other embodiments are contemplated. FIG. 14 shows a valve adjuster 678 according to another embodiment of the invention. The valve adjuster 678 in FIG. 14 is in many respects similar as the above-referenced FIG. 3 valve adjuster 28, and consequently the same reference numerals are used to denote structures corresponding to similar structures in the FIG. 3 valve adjuster 28. In addition, the foregoing description of the FIG. 3 valve adjuster 28 is equally applicable to the valve adjuster 678 except as noted below. Moreover, it will be appreciated upon reading and understanding the specification that aspects of the valve adjusters 28, 678 may be substituted for one another or used in conjunction with one another where applicable.

The valve adjuster 678 is mechanically coupled to the vent air valve 50 and the inert gas valve 54 by means of an inert gas valve lever arm 690, an inert gas valve pivot 698 that pivotally connects the inert gas valve lever arm 690 to the inert gas valve 54, a vent air valve lever arm 708, a vent air valve fixed joint 710 that fixedly connects the vent air valve lever arm 708 to the vent air valve 50, a proportional control actuator sliding pivot 550 that pivotally and slidably connects the inert gas valve lever arm 690 to a proportional control actuator 56, a pressure differential actuator pivot 554 that pivotally connects the inert gas valve lever arm 690 to an upper end of a pressure differential actuator 560, and a pressure differential actuator fixed joint 720 that fixedly connects the vent air valve lever arm 708 to a lower end of the pressure differential actuator 560.

As atmospheric pressure 500 increases relative to tank pressure 502, for example during a descent phase of the aircraft, the pressure differential actuator 560 urges the pressure differential actuator pivot 554 and the pressure differential actuator fixed joint 720 downward in FIG. 14, which the inert gas valve lever arm 690 translates into upward movement of the inert gas valve pivot 698 as the inert gas valve lever arm 690 pivots about the proportional control actuator sliding pivot 550, and the vent air valve lever arm 708 translates into downward movement of the vent air valve fixed joint 710, which translates into for example sliding downward movement of a converging section 722 relative to a housing section 724 of the vent air valve 50. The upward movement of the inert gas valve pivot 698 causes the inert gas valve 54 to open or further open, allowing a greater amount of inert gas, for example NEA, to flow through the inert gas valve 54 and to the mixer 24 and tank 36. The downward movement of the vent air valve fixed joint 710 causes the vent air valve 50 to open or further open, allowing a greater amount of ambient air to flow through the vent air valve 50 and to the mixer 24 and tank 36. As atmospheric pressure 500 decreases relative to tank pressure 502, for example during a climb phase of the aircraft, the pressure differential actuator 560 urges the pressure differential actuator pivot 554 and the pressure differential actuator fixed joint 720 upward in FIG. 14, which the inert gas valve lever arm 690 translates into downward movement of the inert gas valve pivot 698 as the inert gas valve lever arm 690 pivots about the proportional control actuator sliding pivot 550, and the vent air valve lever arm 708 translates into upward movement of the vent air valve fixed joint 710. The downward movement of the inert gas valve pivot 698 causes the inert gas valve 54 to close or approach the closed position, allowing a less amount of inert gas, for example NEA, to flow through the inert gas valve 54 and to the mixer 24 and tank 36. The upward movement of the vent air valve fixed joint 710 causes the vent air valve 50 to close or approach the closed position, allowing less amount of ambient air or tank ullage gas to flow through the vent air valve 50.

The valve adjuster 678 mechanically couples the vent air valve 50 and the inert gas valve 54 so that the valves 50, 54 adjust simultaneously via the inert gas valve lever arm 690 and the vent air valve lever arm 708 in response to increases and decreases in the pressure difference between atmospheric pressure 500 and tank pressure 502. Of course, delays can be incorporated into the responses of the valves 50, 54 and/or the pressure differential actuator 560, for example by lost motion mechanisms or the like, so that adjustments in the valves 50, 54 are not simultaneous, or movement in the pressure differential actuator 560 does not simultaneously translate into movement in the valves 50, 54. It will also be appreciated that the vent air valve 50, the inert gas valve 54, and the pressure differential actuator 560, are passively operated components in that their function is driven mechanically by changes in atmospheric pressure 500 and tank pressure 502 rather than electronically by electronic sensors and/or electronic actuators or electronic controllers.

The inert gas valve 54 is mechanically coupled to the vent air valve 50 so that flow control of inert gas flow 32 through the inert gas valve 54 is coupled to flow control of vent air 30 through the vent air valve 50 in response to the pressure differential between the ambient atmospheric pressure 500 and the tank pressure 502. In the FIG. 14 valve adjuster 678, the connection points of the inert gas valve pivot 698, the proportional control actuator sliding pivot 550, and the pressure differential actuator pivot 554, along the inert gas valve lever arm 690, and the connection points of the vent air valve fixed joint 710 and the pressure differential actuator fixed joint 720 along the vent air valve lever arm 708, govern the control of inert gas flow 32 and vent air flow 30. For example, where the distance H between the inert gas valve pivot 698 and the proportional control actuator sliding pivot 550 becomes longer and the distance J between the proportional control actuator sliding pivot 550 and the pressure differential actuator pivot 554 becomes shorter, the change in flow control of inert gas flow 32 through the inert gas valve 54 due to pressure differential changes will increase relative to flow control of vent air 30 through the vent air valve 50 due to pressure differential changes, latter of which remains unchanged with changes in the position of the sliding pivot 550. Where the distance H becomes shorter and the distance J becomes longer, the change in flow control of inert gas flow 32 through the inert gas valve 54 due to pressure differential changes will decrease relative to flow control of vent air 30 through the vent air valve 50 due to pressure differential changes, latter of which remains unchanged with changes in the position of the sliding pivot 550.

The FIG. 14 valve adjuster 678 is also configured to passively adjust the vent air valve 50 and inert gas valve 54 based on the oxygen concentration in the ullage space 84 of the tank 36 or the oxygen concentration in the high flow inert gas line 124. This direct passive macroscopic flow control can be achieved by mechanical or fluid mechanical magnification of small-scale volumetric/length changes from stimuli sensitive materials that are sensitive to oxygen concentration, and/or their effects on flow behavior in microfluidic devices. The proportional control actuator 56 of the FIG. 14 embodiment utilizes a stimuli sensitive material. The expansion and contraction behavior of the stimuli sensitive material will depend on the properties and geometry of the material. In one form, the stimuli sensitive material may be made up of a stimuli sensitive polymer material. In another form, the stimuli sensitive material may be made up of a stimuli sensitive gel material. The proportional control actuator 56 includes a fulcrum 580 that is pivotally and slidably connected to the inert gas valve lever arm 690 via the proportional control actuator sliding pivot 550. The fulcrum 580 is connected to a rod 582, which in turn is connected to a stimuli sensitive material actuator 592. The stimuli sensitive material actuator 592 is enclosed in a housing 594 that has a sliding support 600 within which the rod 582 can reciprocate and a port 608 in fluid communication with the ullage space 84 of the tank 36 or the high flow inert gas line 124. The sliding support 600 can be in the form of a bore, bushing, linear bearing or the like within which the rod 582 axially slides. Any suitable pipe or conduit structure can be used to fluidly connect the port 608 to the ullage 84 or the high flow inert gas line 124.

In operation, where the port 608 is in fluid communication with the ullage 84 of the tank 36, an increase in oxygen concentration in the ullage 84 will cause the stimuli sensitive material of the stimuli sensitive material actuator 592 to expand, thereby urging the rod 582 and hence the fulcrum 580 rightward in the FIG. 14 illustration and changing the position of the proportional control actuator sliding pivot 550 so that the distance H is relatively greater and the distance J is relatively less than before the change in oxygen concentration. As such, an increase in atmospheric pressure 500 relative to tank pressure 502 will cause the inert gas valve 54 to allow a greater amount of inert gas flow than the amount of vent air flow allowed by the vent air valve 50 owing to the change in position of the fulcrum 550. On the other hand, a decrease in oxygen concentration in the ullage 84 will cause the stimuli sensitive material of the stimuli sensitive material actuator 592 to contract, thereby urging the rod 582 and hence the fulcrum 580 leftward in FIG. 14 and changing the position of the proportional control actuator sliding pivot 550 so that the distance H is relatively smaller and the distance J is relatively greater than before the change in oxygen concentration. As such, an increase in atmospheric pressure 500 relative to tank pressure 502 will cause the inert gas valve 54 to allow a lesser amount of inert gas flow than the amount of vent air flow allowed by the vent air valve 50 owing to the change in position of the fulcrum 550.

The port 608 may alternatively be in fluid communication with the high flow inert gas line 124. As such, the stimuli sensitive material actuator 592 of the valve adjuster 678 responds to oxygen concentration in the high flow inert gas line 124 to change the ratio of controlled flow of vent air 30 and inert gas 32 by the respective vent air valve 50 and inert gas valve 54.

As with the valve adjuster 28, an amplifier 624 such as shown in FIG. 12 may be used in the FIG. 14 valve adjuster 678 to amplify volumetric/length changes in the stimuli sensitive material of the stimuli sensitive material actuator 592. Further, the proportional control actuator 56 of the valve adjuster 28 need not be limited to passive actuation and instead can rely on an active actuation device, an example of which is shown in FIG. 13.

Referring again to FIGS. 1-3, as will be appreciated, flow of vent air 30 through the inert gas and vent air control assembly 12 can be controlled via the vent air valve 50 and by means of the pressure difference between upstream (ambient) pressure 500 and downstream (tank) pressure 502 after inert gas flow 32 (NEA in FIG. 1) and vent air 30 have mixed. Flow of inert gas 32 through the inert gas and vent air control assembly 12 is controlled via the inert gas valve 54 restricting the inert gas flow 32 based on the inflow of vent air 30 and directly coupled to the vent air valve 50. Coupling between the inert gas flow valve 54 and the vent air valve 50 and therefore the mixture or mass flow ratio of the inert gas/vent air mixture flowing into the fuel tank compartment 44 is adjusted passively in real-time based on the oxygen concentration in the high flow inert gas line 124 and/or the oxygen concentration in the ullage space 84 of the tank compartment 44. The inert gas and vent air control assembly 12 is calibrated so that the passive adjustment only allows as much inert gas (NEA) to the tank compartment 44 that is needed to assure the oxygen concentration in the ullage space 84 of the compartment 44 does not exceed its allowable limits.

As noted above, direct passive macroscopic flow control can be achieved by mechanical or fluid mechanical magnification of small-scale volumetric/length changes from stimuli sensitive materials that are sensitive to oxygen concentration, and/or their effects on flow behavior in microfluidic devices, to assure that the inert gas is used efficiently and that the resulting mixture entering the fuel tank 36 yields oxygen and pressure conditions within allowable limits. Additionally, or alternatively, the prescribed control can be achieved by electrochemical oxygen sensors 658 and electronic actuation mechanisms 654 implemented in the inert gas and vent air control assembly 12. As described above with respect to the valve adjusters 28, 678, the change in the effective flow area for the inert gas valve 54 is coupled to changes in the effective flow area for the vent air flow valve 50 (both of which are controlled by the difference between ambient pressure 500 and tank pressure 502) and the coupling is controlled by changes in oxygen concentration of the high flow inert gas line 124 and/or the ullage space 84.

The control functions for regulating (local) tank pressure and oxygen concentration of inflowing vent air/inert gas mixture are accomplished directly within the inert gas and vent air control assembly 12 passively via mechanical and fluid mechanical means (rather than actively by electronic means and by distributed control in the aircraft inerting and venting system 10). The inert gas and vent air control assembly 12 can employ such passive control instead of active sensor based control of the inert gas flow 32. In addition, the inert gas and vent air control assembly 12 has a configuration where the passive sensor (for example stimuli sensitive material such as stimuli sensitive polymer or stimuli sensitive gel, of the stimuli sensitive material actuator 592) and the valve adjuster 28, 678 are co-located. As such, the passive mechanically controlled aircraft inerting and venting system 10 locally and efficiently controls both tank pressure and tank oxygen concentration.

FIG. 1 shows the inert gas and vent air control assembly 12 (w/o its internal control valves) installed on a single tank compartment 44 of an aircraft fuel tank 36. One inlet of the inert gas and vent air control assembly 12 is connected to the vent air line 150, while the other inlet is connected to the high flow inert gas line 124 fluidly connected to the valve 110. As shown in FIG. 1, the low flow inert gas line 122 is connected to the injectors 130, 132, 134 located in the respective fuel tank compartments 40, 42, 44. During ground operations, climb and cruise phases and taxi of the mission, the inert gas flow is injected into the fuel tank compartments 40, 42, 44 as shown through the injectors 130, 132, 134. Inerted air from the third tank compartment 44 exits the aircraft inerting and venting system 10 through the inert gas and vent air control assembly 12, that is, through the valve adjuster 28 and mixer 24 (or alternatively through another one-way valve installed on the fuel tank 36). Since the inert gas and vent air control assembly 12 is sized for high inert gas flow during descent, there is a relatively smaller pressure drop across the inert gas and vent air control assembly 12 during the low flow mode with outward directed flow from the ullage space 84 of the tank compartment 44. During the descent phase the high flow of inert gas (with comparatively high concentration of oxygen) is mixed with the incoming ambient air prior to being admitted to the fuel tank compartment 44. The inventors have found that this effectively prevents local high oxygen concentration zones, or so called "hot spots," especially within the tank compartment 44.

Figure 15:
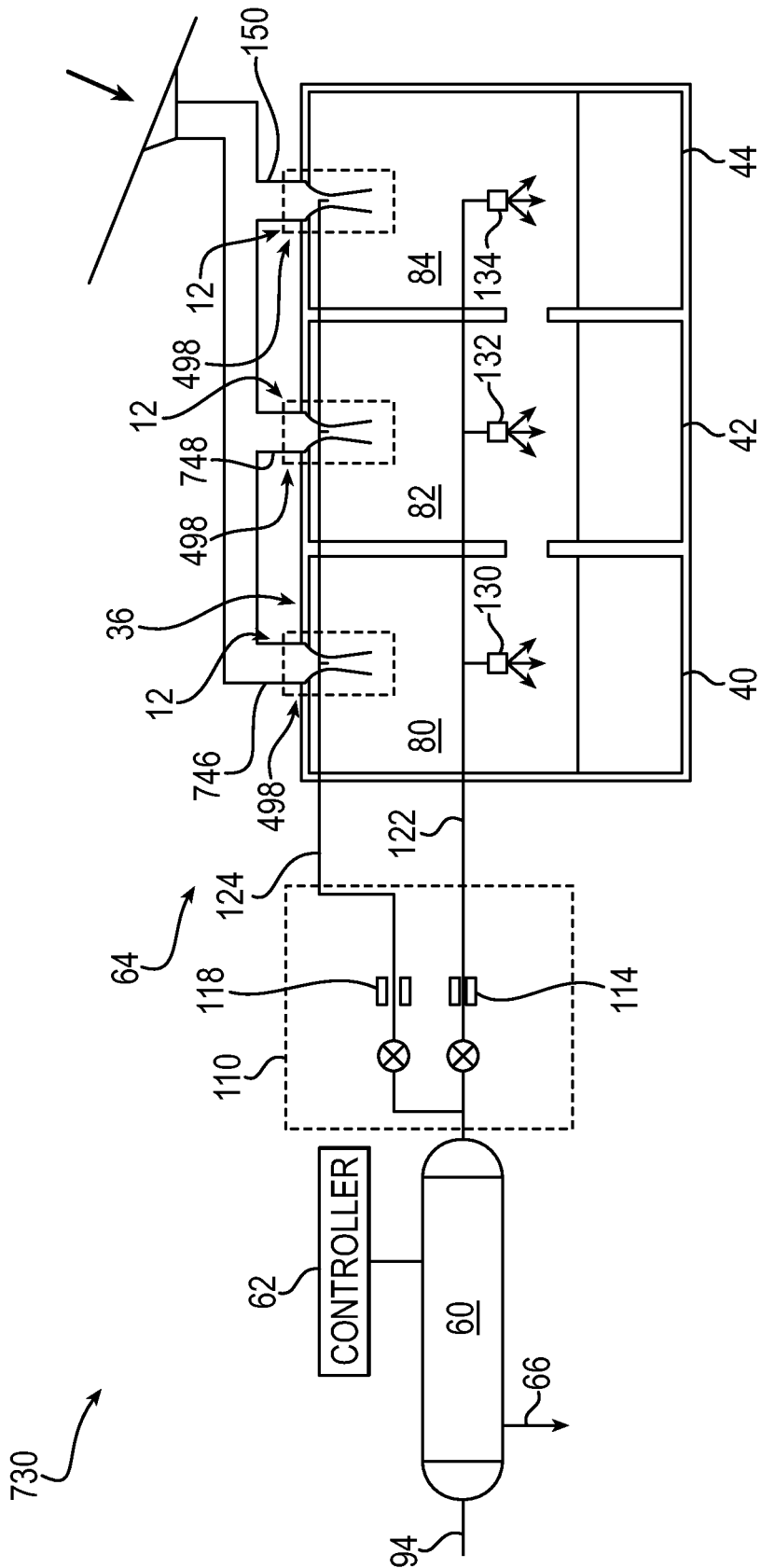
FIG. 15 is a schematic diagram of an aircraft inerting and venting system in accordance with another embodiment of the invention.
Figure 16:
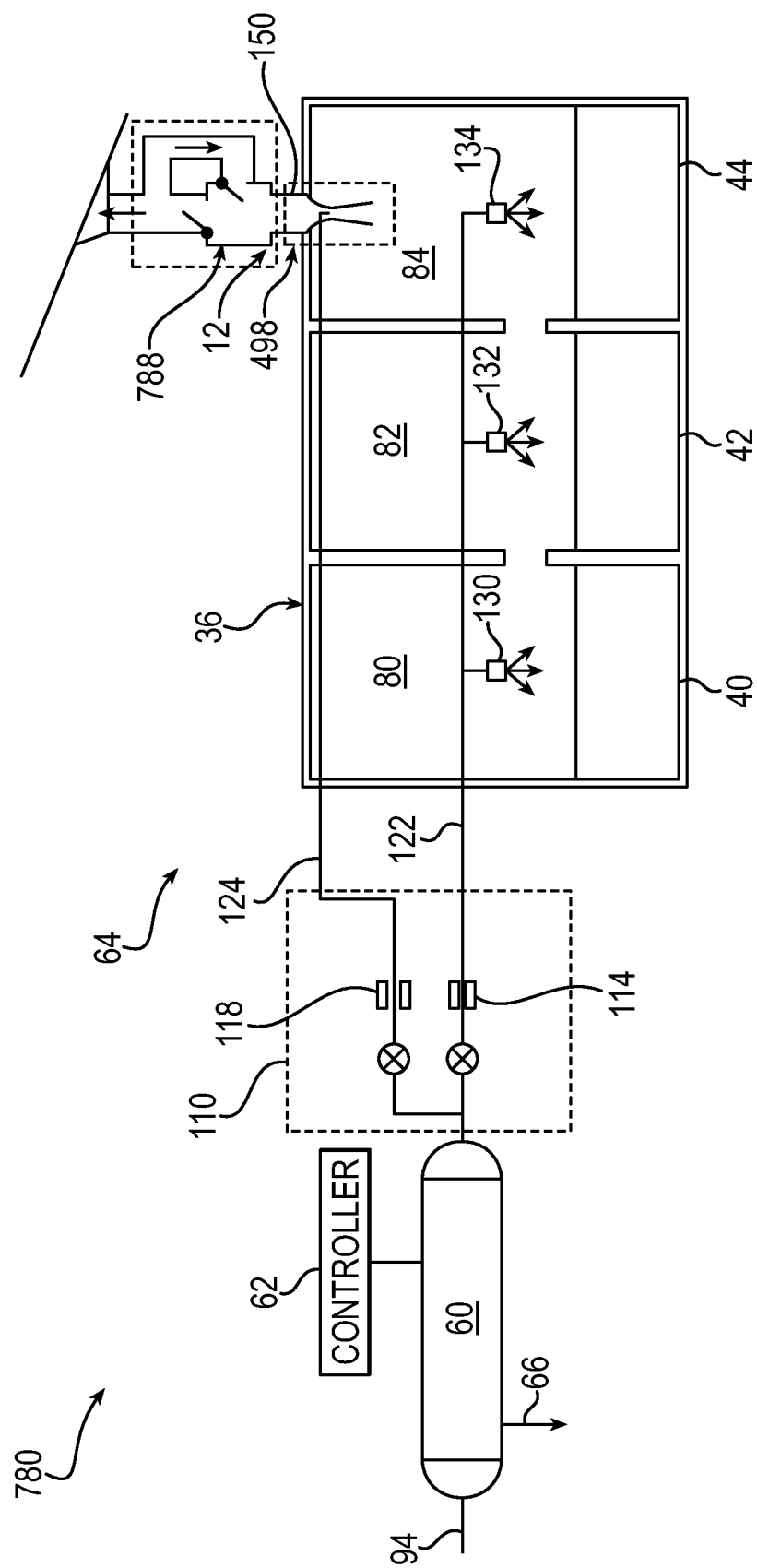
FIG. 16 is a schematic diagram of an aircraft inerting and venting system in accordance with another embodiment of the invention.

FIGS. 15 and 16 show respective aircraft inerting and venting systems 730, 780 according to other embodiments of the invention. The aircraft inerting and venting systems 730, 780 in FIGS. 15 and 16 are in many respects similar as the above-referenced FIG. 1 aircraft inerting and venting system 10, and consequently the same reference numerals are used to denote structures corresponding to similar structures in the FIG. 1 system 10. In addition, the foregoing description of the FIG. 1 aircraft inerting and venting system 10 is equally applicable to the aircraft inerting and venting systems 730, 780 of FIGS. 15 and 16 except as noted below. Moreover, it will be appreciated upon reading and understanding the specification that aspects of the aircraft inerting and venting systems 10, 730, 780 may be substituted for one another or used in conjunction with one another where applicable.

Referring to FIG. 15, if more uniform oxygen concentration is desired across all (or a greater quantity than one) of fuel tank compartments 40, 42, 44 of the fuel tank 36, an inert gas and vent air control assembly 12 (or only a mixer 24 or a valve adjuster 28 thereof) can be installed in multiple fuel tank compartments 40, 42, 44 with respective separate corresponding air flow lines 746, 748, 150. The inert gas and vent air control assemblies 12 can be integrated into the fuel tank walls 498, connected to the vent air lines 746, 748, 150, as shown in FIG. 15.

The aircraft inerting and venting system 10 can be installed in open vent systems such as shown in FIGS. 1 and 15, or closed vent systems. FIG. 16 shows an aircraft inerting and venting system 780 installed in a closed vent system, which is commonly used on military aircraft. The FIG. 16 system 780 may utilize a so called climb/dive valve 788. During the climb phase of the aircraft, the climb/dive valve 788 installed at the inlet of the vent air line 150 opens at a certain positive pressure differential; while during descent phase the climb/dive valve 788 admits ambient air to the fuel tank 36 when a certain negative pressure differential is reached. As will be appreciated, in some applications, the vent air line 150 can provide some redundancy to the climb/dive valve 788 of the closed-vent system. Also, the inert gas 32 is admitted into the vent line 150 to mix with the vent air 30 (FIG. 3). Control of the inert gas flow 32 takes place via the inert gas control valve 54 connected to the high flow branch 124 of the inert gas or OBIGGS system 60 (FIG. 16).

Reference is now made to FIG. 17, which shows another embodiment of an inert gas and vent air control assembly 800. The inert gas and vent air control assembly 800 includes a housing 810 mounted to a fuel tank wall 812, a valve adjuster 814 including a threaded spindle 820, a piston 836, and a pressure differential actuator 840 formed by opposite ends of the piston 836 exposed to atmospheric pressure 500 and tank pressure 502, a mixer 838 formed by a lower interior of the piston 836, and an inert gas plenum 846. The threaded spindle 820 is fixedly attached to the fuel tank wall 812 for example by not shown radial spokes, and the piston 836 is mounted at its center, for example at a hub thereof, for axial movement along and rotational movement about the threaded spindle 820 (up and down in FIG. 17). A large diameter spring 850 or other biasing member is disposed between the bottom of the piston 836 and the fuel tank wall 812 to exert a biasing force against the piston 836, and thus against atmospheric pressure 500 acting on the opposite (upper) side of the piston 836. An annular ring 854 may be provided radially inward of the spring 850 to slidably engage respective inner diameter portions of the piston 836 to facilitate smooth axial and rotational movement of the piston 836. The piston 836 includes an upper disk 860 and a lower disk 870. The top portion of the upper disk 860 is closed to flow and the bottom of the lower disk 870 is closed to flow from its outer diameter up to the annular ring 854. The bottom center of the lower disk within the annular ring 854 is open to flow. The upper disk 860 defines a plurality of circumferentially spaced radial passages 874 that fluidly communicate upstream vent air flow 30 from the fuel tank vent air line 150 to the ullage 84 of the fuel tank 36. The lower disk 870 defines a plurality of circumferentially spaced radial passages 876 that fluidly communicate upstream inert gas flow 32 from the high flow inert gas line 124 through the inert gas plenum 846 to the ullage 84 of the fuel tank 36. A vent air valve 880 is formed between the housing 810 wall and the top portion of the upper disk 860. An inert gas valve 890 is formed between the housing 810 wall and the perimeter of the lower disk 870 and the radial passages 876 therein. Depending on its height, the annular ring 854, if provided, may define a plurality of circumferentially spaced radial openings that fluidly communicate vent air flow 30 from the radial passages 874 to the ullage 84 of the fuel tank 36, and a plurality of circumferentially spaced radial openings that fluidly communicate inert gas flow 32 from the radial passages 876 to the ullage 84 of the fuel tank 36.

The housing 810 includes a plurality of circumferentially spaced stimuli sensitive material actuators 926 that are formed in respective circumferentially spaced slits in the housing 810, thereby controlling the flow through these slits as described later. The radially distal ends of the stimuli sensitive material actuators 926 and their other surfaces are exposed to inert gas by the inert gas plenum 846. The slits in the housing which contain the stimuli sensitive material actuators 926 are vertically and angularly positioned such that as the piston 836 moves axially downward and rotationally counterclockwise about the spindle 820, the slits and the stimuli sensitive material actuators 926 therein increasingly align/overlap axially and angularly relative to the radial passages 876. In addition, the slits and the stimuli sensitive material actuators 926 therein are vertically positioned in the housing 810 such that downward movement of the piston 836 will not expose the stimuli sensitive material actuators 926 to the vent air 30 or the upper disk 860 of the piston 836.

The stimuli sensitive material actuators 926 are formed by a porous material made of or impregnated with stimuli sensitive material that expands and contracts in response to respective increases and decreases in oxygen concentration in the inert gas flow 32. The expansion and contraction behavior of the stimuli sensitive material will depend on the properties and geometry of the material. In one form, the stimuli sensitive material may be made up of a stimuli sensitive polymer material. In another form, the stimuli sensitive material may be made up of a stimuli sensitive gel material. FIG. 18 shows an enlarged view of a portion of the porous material made of or impregnated with stimuli sensitive material as viewed from the outside of the housing 810. As shown in the left figure of FIG. 18, as oxygen concentration increases, the stimuli sensitive material 940, which is in the form of a cylinder bundle of fibers in the illustrative embodiment, expands to enlarge the central pore area 950 of the cylinder bundle. The enlarged central pore area 950, in turn, allows a relatively greater amount of inert gas flow 32 therethrough as compared to before the increase in oxygen concentration. As shown in the right figure of FIG. 18, as oxygen concentration decreases, the stimuli sensitive material 940 contracts to shrink the central pore area 950. The reduced size central pore area 950, in turn, allows a relatively less amount of inert gas flow 32 therethrough as compared to before the decrease in oxygen concentration. The inventors have found that, while the stimuli-sensitive material expansions and contractions may be limited to the microscale, controlling the effective flow area of a macroscopic flow device, such as the flow area controlled by the stimuli sensitive material actuators 926, can be realized by providing a sufficient porous material flow area made of or impregnated with the stimuli sensitive material. Thus, the larger the porous material surface area, the larger is the effective expansion and retraction surface area through which inert gas flow 32 is respectively allowed and restricted by the stimuli sensitive material actuators 926.

The valve adjuster 814 is mechanically coupled to the vent air valve 880, which controls flow of vent air 30 from the ambient atmosphere to the tank 36, and to the inert gas valve 890, which controls flow of inert gas 32 from the inert gas source 60 (FIG. 1) to the tank 36. The valve adjuster 814 is configured to passively adjust the vent air valve 880 and the inert gas valve 890 in response to a pressure differential between ambient atmosphere 500 and pressure 502 of the tank 36. Thus, as atmospheric pressure 500 increases relative to tank pressure 502, for example during a descent phase of the aircraft, the piston 836 of the pressure differential actuator 840 is urged downward and counterclockwise about the spindle 820 in FIG. 17. The downward and counterclockwise rotation movement of the piston 836 causes the inert gas valve 890 to open or further open, allowing a greater amount of inert gas, for example NEA, to flow through the inert gas valve 890 and to the mixer 838 and tank 36. The downward and counterclockwise rotation movement of the piston 836 also causes the vent air valve 880 to open or further open, allowing a greater amount of ambient air to flow through the vent air valve 880 and to the mixer 838 and tank 36. As atmospheric pressure 500 decreases relative to tank pressure 502, for example during a climb phase of the aircraft, the piston 836 of the pressure differential actuator 840 is urged upward and clockwise about the spindle 820 in FIG. 17. The upward and clockwise rotation movement of the piston 836 causes the inert gas valve 890 to close or approach the closed position, allowing a less amount of inert gas, for example NEA, to flow through the inert gas valve 890 and to the mixer 838 and tank 36. The upward and clockwise rotation movement of the piston 836 also causes the vent air valve 880 to close or approach the closed position, allowing less amount of ambient air to flow through the vent air valve 880 and to the mixer 838 and tank 36.

As will be appreciated, the valve adjuster 814 mechanically couples the vent air valve 880 and the inert gas valve 890 so that the valves 880, 890 adjust simultaneously via movement in the piston 836 in response to increases and decreases in the pressure difference between atmospheric pressure 500 and tank pressure 502. It will also be appreciated that the vent air valve 880, the inert gas valve 890, and the pressure differential actuator 840, are passively operated components in that their function is driven mechanically by changes in atmospheric pressure 500 and tank pressure 502 rather than electronically by electronic sensors and/or electronic actuators or electronic controllers.

The inert gas valve 890 is mechanically coupled to the vent air valve 880 so that flow control of inert gas flow 32 through the inert gas valve 890 is proportional to flow control of vent air 30 through the vent air valve 880 in response to the pressure differential between the ambient atmospheric pressure 500 and the tank pressure 502. In the FIG. 17 valve adjuster 814, the vent air valve 880 provides an adjustable effective flow area 970 between the upper disk 860 of the piston 836 and the housing 810 wall, and the inert gas valve 890 provides an adjustable effective flow area 972 by the axial and angular alignment/overlap, of the stimuli sensitive material actuators 926 relative to the radial passages 876. Changes in the effective flow area 970 relative to the effective flow area 972 yield the proportional flow control. For example, in an initial downward and counterclockwise rotational movement of the piston 836 due to increased atmospheric pressure 500, the effective area 970 may be equal to the effective area 972 such that the proportion of vent air flow 30 admitted by the vent air valve 880 to inert gas flow 32 admitted by the inert gas valve 890 is substantially one to one during the initial increased atmospheric pressure 500. In a further downward and counterclockwise rotational movement of the piston 836 due to further increased atmospheric pressure 500, the effective area 970 may become greater than the effective area 972 such that the amount of vent air flow 30 admitted by the vent air valve 880 is proportionally greater than the amount of inert gas flow 32 admitted by the inert gas valve 890 during the further increased atmospheric pressure 500.

The stimuli sensitive material actuators 926 are configured to passively adjust the inert gas valve 890 based on the oxygen concentration in the high flow inert gas line 124. Here, direct passive macroscopic flow control is achieved by providing a large enough area of stimuli-sensitive material wetted by the NEA or inert gas flow, so that small-scale volumetric/length changes of the stimuli sensitive materials due to changes in oxygen concentration provide macroscopic NEA flow control. The stimuli sensitive material actuators 926 of the FIG. 17 embodiment utilize a stimuli sensitive material in the family of polymers or gels, for example. The expansion and contraction behavior of the stimuli sensitive material will depend on the properties and geometry of the material. In one form, the stimuli sensitive material may be made up of a stimuli sensitive polymer material. In another form, the stimuli sensitive material may be made up of a stimuli sensitive gel material.

In operation, an increase in oxygen concentration in the high flow inert gas line 124 will cause the stimuli sensitive material of the stimuli sensitive material actuators 926 to expand, so that central pore areas 950 are relatively larger than before the change in oxygen concentration. As such, an increase in atmospheric pressure 500 relative to tank pressure 502 will cause the inert gas valve 890 to allow a proportionately greater amount of inert gas flow relative to the amount of vent air flow allowed by the vent air valve 880 owing to the enlarging of the central pore areas 950 of the actuators 926. On the other hand, a decrease in oxygen concentration in the high flow inert gas line 124 will cause the stimuli sensitive material of the stimuli sensitive material actuators 926 to contract, so that the central pore areas 950 are relatively smaller than before the change in oxygen concentration. As such, a decrease in atmospheric pressure 500 relative to tank pressure 502 will cause the inert gas valve 890 to allow a proportionately less amount of inert gas flow relative to the amount of vent air flow allowed by the vent air valve 880 owing to the reduced size central pore areas 950 of the stimuli sensitive material actuators 926.

The inert gas and vent air control assembly 12, 800 need not be limited to the configurations of FIGS. 3, 14 and 17, and other embodiments are contemplated. FIGS. 19, 21, 22 and 24 show inert gas and vent air control assemblies 1000, 1100, 1200, 1400 according to other embodiments of the invention. The inert gas and vent air control assemblies 1000, 1100, 1200, 1400 in FIGS. 19, 21, 22 and 24 are in many respects similar as the above-referenced inert gas and vent air control assemblies 12, 800 of FIGS. 3, 14 and 17, and consequently the same reference numerals are used to denote structures corresponding to similar structures in the inert gas and vent air control assemblies 12, 800. In addition, the foregoing description of the inert gas and vent air control assemblies 12, 800 of FIGS. 3, 14 and 17 is equally applicable to the inert gas and vent air control assemblies 1000, 1100, 1200, 1400 except as noted below. Moreover, it will be appreciated upon reading and understanding the specification that aspects of the inert gas and vent air control assemblies 12, 800, 1000, 1100, 1200, 1400 may be substituted for one another or used in conjunction with one another where applicable.

Figure 19:
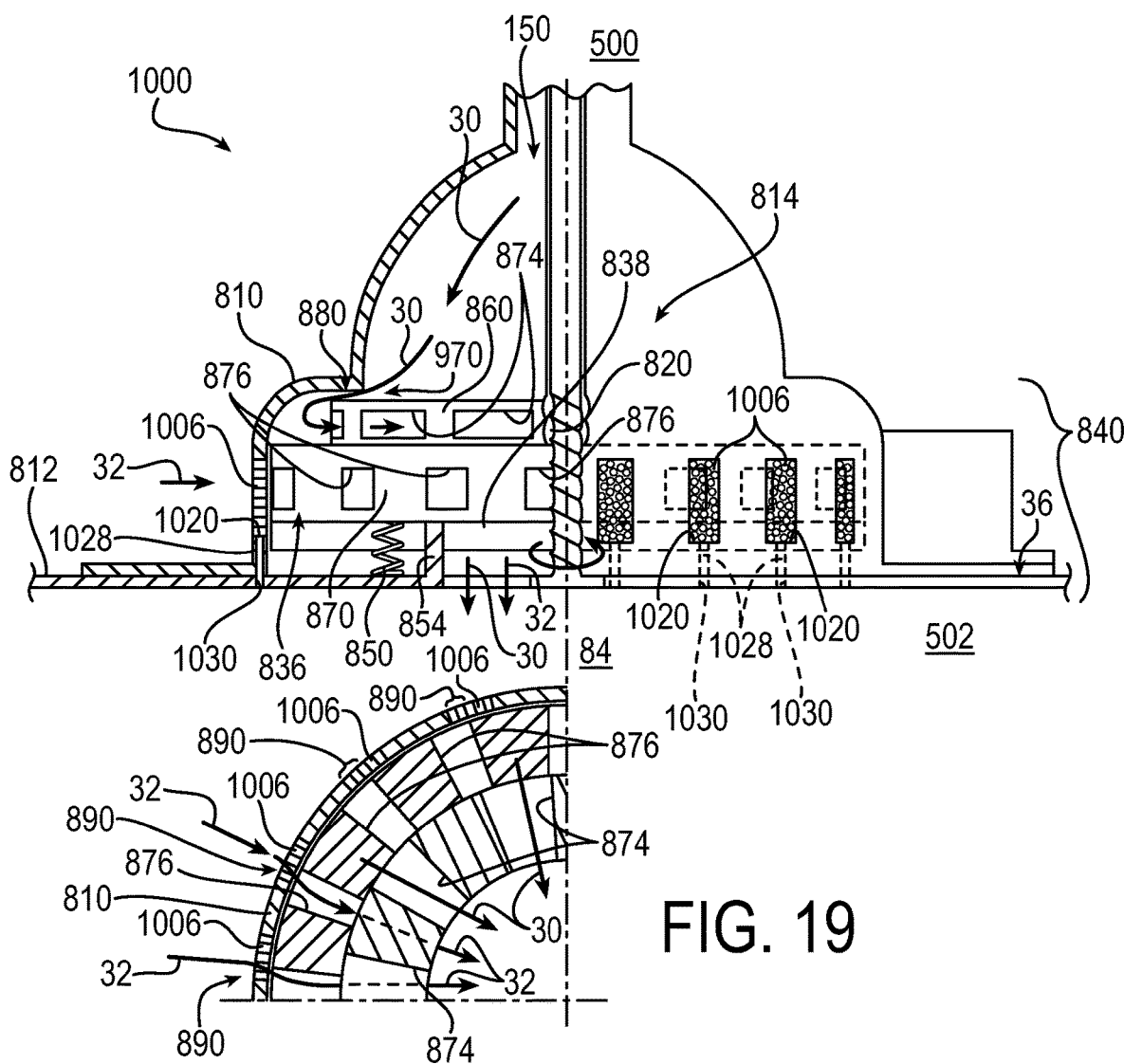
FIG. 19 is a schematic diagram of an inert gas and vent air control assembly according to another embodiment of the invention.
Figure 20:
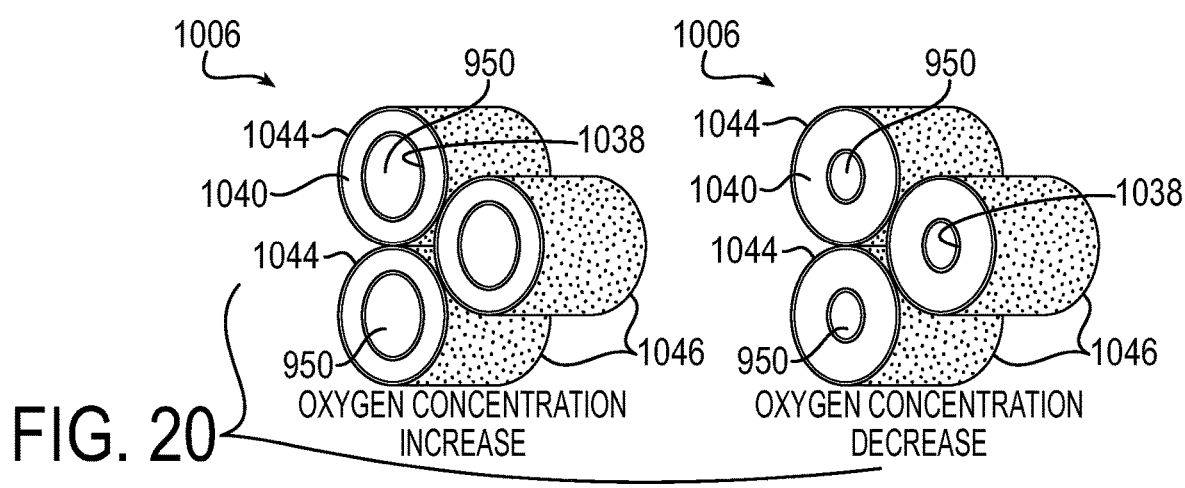
FIG. 20 is a perspective view of stimuli sensitive material actuators of the inert gas and vent air control assembly of FIG. 19.

The stimuli sensitive material actuators 926 of the FIG. 17 inert gas and vent air control assembly 800 are actuated by oxygen concentration changes in the high flow inert gas line 124. It will be appreciated that the actuation may be by other means, for example, by means of oxygen concentration changes in the ullage space 84 of the fuel tank 36. FIG. 19 shows an inert gas and vent air control assembly 1000 having such a configuration. In FIG. 19, stimuli sensitive material actuators 1006 are distributed in a circumferentially spaced apart manner in respective slits in the housing 810, as in the FIG. 17 embodiment, but are exposed at the lower portions 1020 of the slits to the ullage space 84 of the fuel tank 36 by means of respective circumferentially spaced flow passages 1028 that extend axially through the housing 810 wall and through respective ports 1030 in the wall 812 of the fuel tank 36. In addition, as shown in FIG. 20, the inner diameters 1038 and the upstream end faces 1040 of the annular bundle of fibers that make up the stimuli sensitive material actuators 1006 include an insulation layer to insulate the NEA wetted area from the stimuli sensitive material. As such, only the outer diameters 1044 and the downstream end faces 1046 are exposed to the ullage space 84 of the tank 36 via the flow passages 1028.

In operation, the stimuli sensitive material actuators 1006 respond to oxygen concentration in the ullage space 84 to change the proportions of controlled flow of vent air 30 and inert gas 32 flowing through the respective vent air valve 880 and inert gas valve 890. Thus, an increase in oxygen concentration in the ullage space 84 will cause the inert gas valve 890 to allow a proportionately greater amount of inert gas flow relative to the amount of vent air flow allowed by the vent air valve 880 owing to the enlarging of the central pore areas 950 of the actuators 1006. Similarly, a decrease in oxygen concentration in the ullage space 84 will cause the inert gas valve 890 to allow a proportionately less amount of inert gas flow relative to the amount of vent air flow allowed by the vent air valve 880 owing to the reduced size central pore areas 950 of the stimuli sensitive material actuators 1006.

In another form, an inert gas and vent air control assembly can combine the functionality of the inert gas and vent air control assembly 800 and the inert gas and vent air control assembly 1000. Such an inert gas and vent air control assembly could then adjust inert gas/vent air flow ratio based on both oxygen concentration of the high flow inert gas line 124 and oxygen concentration of the ullage space 84 of the fuel tank 36.

Figure 21:
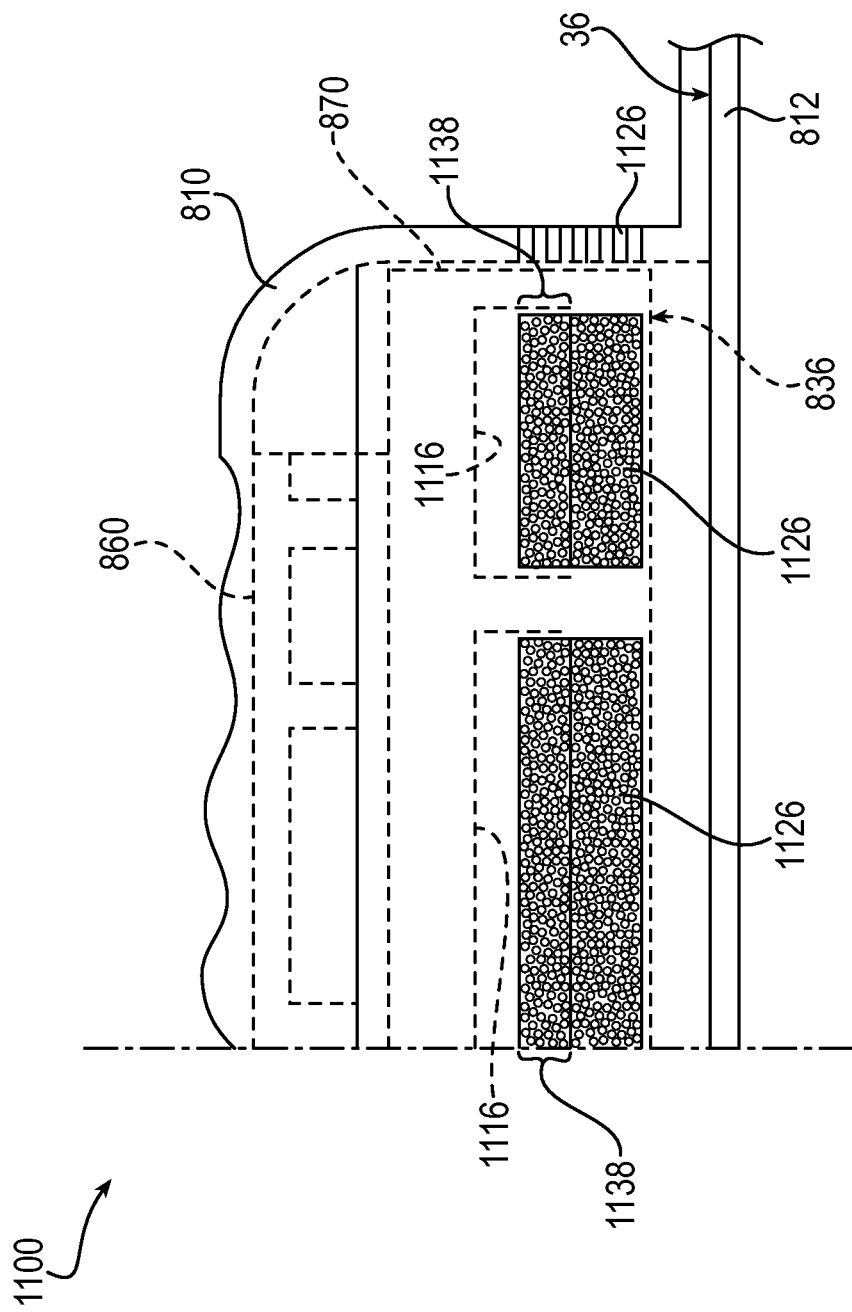
FIG. 21 is a schematic diagram of an inert gas and vent air control assembly according to another embodiment of the invention.

Turning now to FIG. 21, there is shown another embodiment of an inert gas and vent air control assembly 1100. The inert gas and vent air control assembly 1100 is similar to the inert gas and vent air control assembly 800 except that there is no spindle 820, the piston 836 moves only axially and not simultaneously axially and rotationally, and the plurality of circumferentially spaced radial passages 1116 in the lower disk 870 of the piston 836 that fluidly communicate inert gas flow 32 from the inert gas valve 890 to the ullage 84 of the fuel tank 36 are relatively wider and shorter in height than the radial passages 876 of the inert gas and vent air control assembly 800. Similarly, the plurality of circumferentially spaced stimuli sensitive material actuators 1126 that are formed in respective circumferentially spaced slits in the housing 810 are relatively wider and shorter in height than the stimuli sensitive material actuators 926 of the inert gas and vent air control assembly 800. The stimuli sensitive material actuators 1126 are vertically and angularly positioned such that as the piston 836 moves axially downward, the stimuli sensitive material actuators 1126 increasingly align/overlap axially relative to the radial passages 1116.

The operation of the inert gas and vent air control assembly 1100 is simpler than that of the inert gas and vent air control assembly 800. As atmospheric pressure 500 increases relative to tank pressure 502, for example during a descent phase of the aircraft, the piston 836 is urged downward, causing the inert gas valve 890 to open or further open, allowing a greater amount of inert gas, for example NEA, to flow through the inert gas valve 890 and to the mixer 838 and tank 36. The downward movement of the piston 836 also causes the vent air valve 880 to open or further open, allowing a greater amount of ambient air to flow through the vent air valve 880 and to the mixer 838 and tank 36. As atmospheric pressure 500 decreases relative to tank pressure 502, for example during a climb phase of the aircraft, the piston 836 is urged upward, causing the inert gas valve 890 to close or approach the closed position, allowing a less amount of inert gas, for example NEA, to flow through the inert gas valve 890 and to the mixer 838 and tank 36. The upward movement of the piston 836 also causes the vent air valve 880 to close or approach the closed position, allowing less amount of ambient air or tank ullage gas to flow through the vent air valve 880 and the mixer 838.

The adjustable effective flow area 1138 provided by the inert gas valve 890 is by means of the axial alignment/overlap, of the stimuli sensitive material actuators 1126 relative to the radially extending projecting passages 1116. Changes in the effective flow area 970 relative to the effective flow area 1138 yield the control over the ratio of inert gas flow and vent air flow in the inert gas and vent air control assembly 1100. For example, in an initial downward movement of the piston 836 due to increased atmospheric pressure 500, the effective area 970 may be equal to the effective area 1138 such that the proportion of vent air flow 30 admitted by the vent air valve 880 to inert gas flow 32 admitted by the inert gas valve 890 is substantially one to one during the initial increased atmospheric pressure 500. In a further downward movement of the piston 836 due to further increased atmospheric pressure 500, the effective area 970 may become greater than the effective area 1138 such that the amount of vent air flow 30 admitted by the vent air valve 880 is proportionally greater than the amount of inert gas flow 32 admitted by the inert gas valve 890 during the further increased atmospheric pressure 500.

Figure 22:
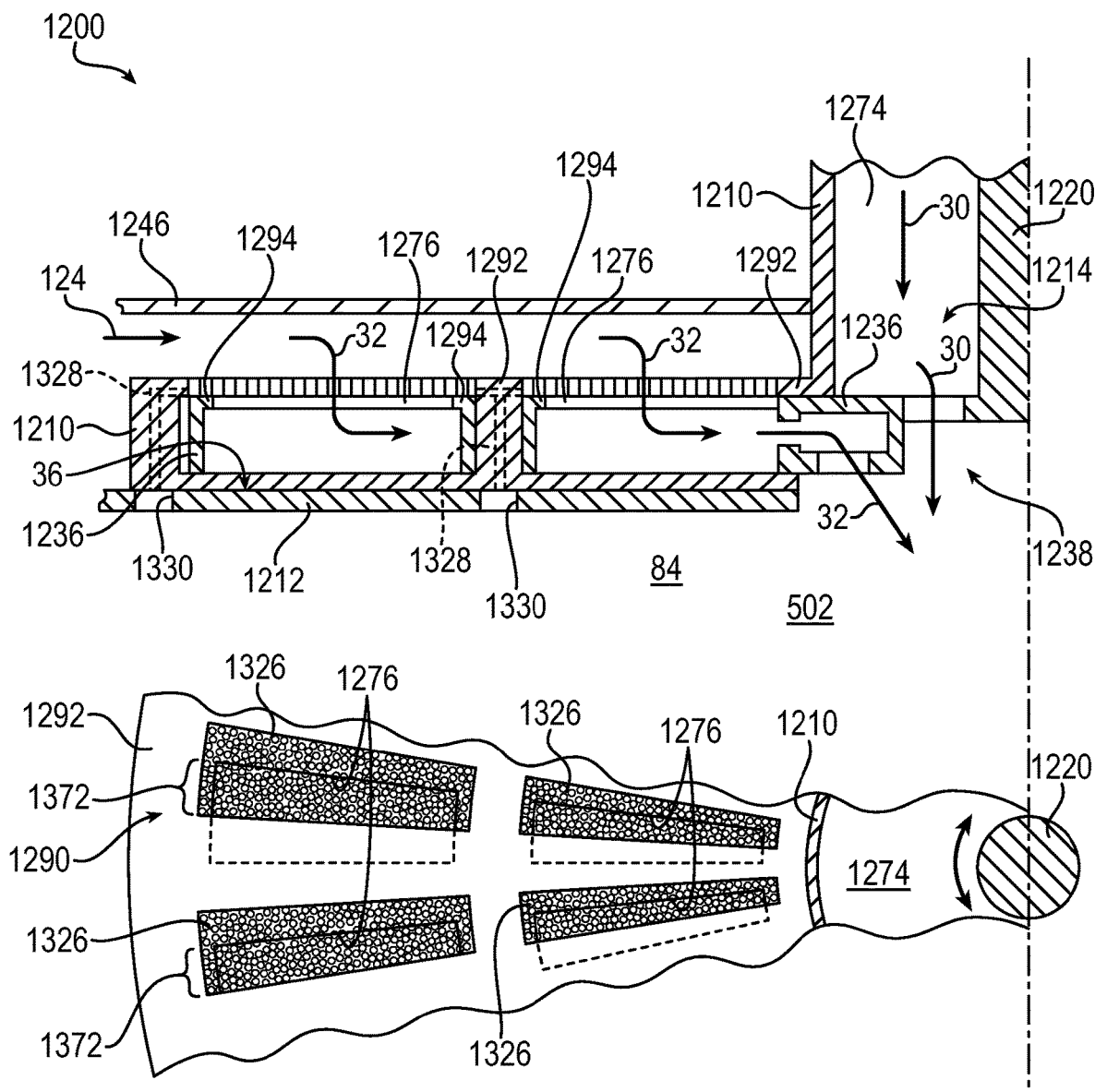
FIGS. 22 and 23 are schematic diagrams of an inert gas and vent air control assembly according to another embodiment of the invention.
Figure 23:
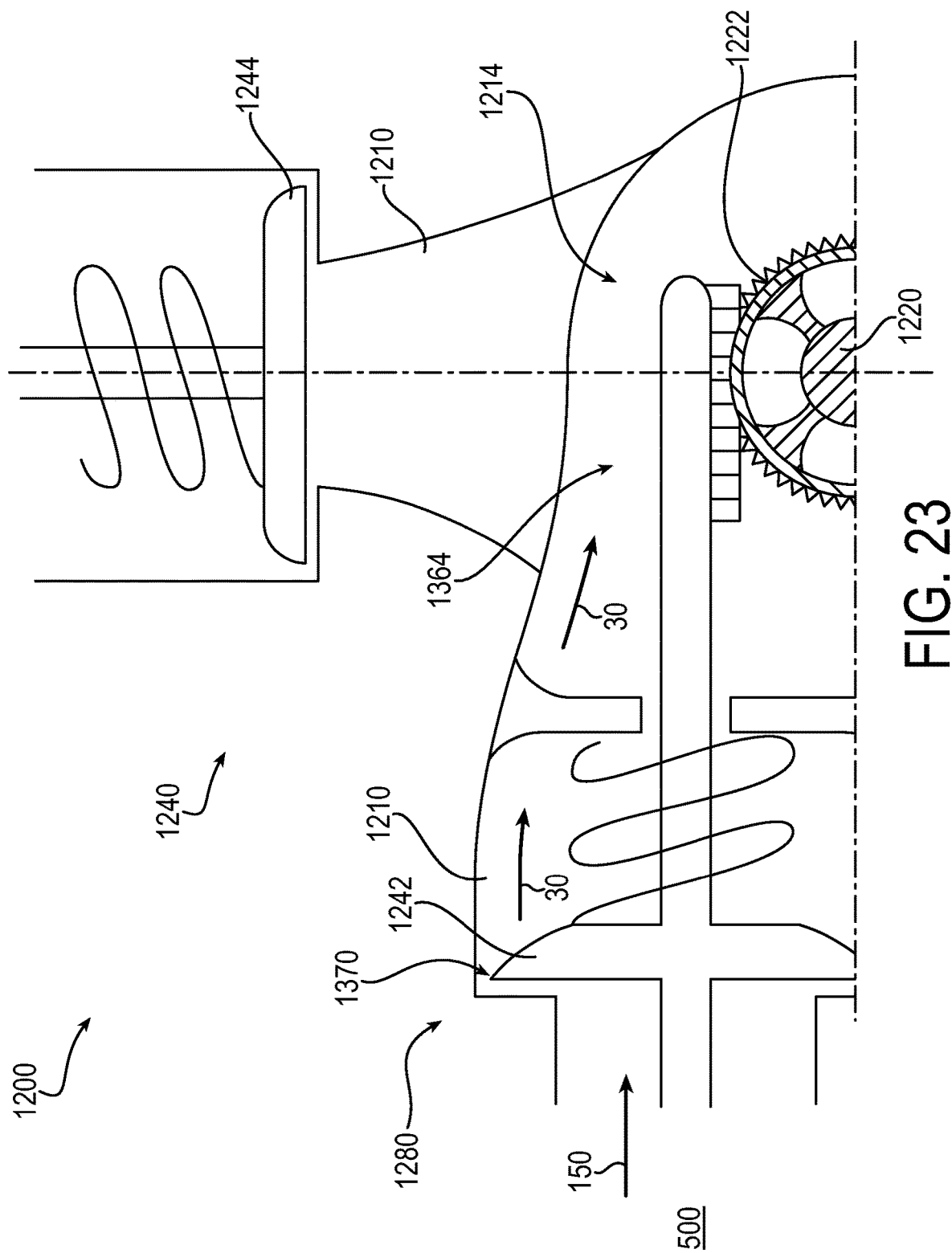

FIGS. 22 and 23 show another embodiment of an inert gas and vent air control assembly 1200. The inert gas and vent air control assembly 1200 includes a housing 1210 mounted to a fuel tank wall 1212, a valve adjuster 1214 including a shaft 1220 coupled at its opposite ends to a gear wheel 1222 (FIG. 23) and a disk 1236 (FIG. 22) and a pressure differential actuator 1240 including an air in poppet 1242 and an air out poppet 1244, a mixer 1238 formed by a lower interior of the disk 1236, and an inert gas plenum 1246. The shaft 1220 is supported for rotational movement in the housing 1210 for example by means of a not shown bore, bushing, or bearing in the housing 1210. The disk 1236 is mounted at its center to the shaft 1236 for rotational movement therewith. The housing 1210 defines an axially extending passage 1274 that fluidly communicates upstream vent air flow 30 from the fuel tank vent air line 150 to the ullage 84 of the fuel tank 36. The disk 1236 defines a plurality of circumferentially spaced radial passages 1276 that fluidly communicate upstream inert gas flow 32 from the high flow inert gas line 124 to the ullage 84 of the fuel tank 36. A vent air valve 1280 is formed by the air in poppet 1242, and the axial passage 1274. An inert gas valve 1290 is formed between an axially upper radially projecting wall 1292 of the housing 1210 and an axially upper radially projecting wall 1294 of the disk 1236, and the radial passages 1276 therein.

The upper wall 1292 of the housing 1210 includes a plurality of circumferentially spaced stimuli sensitive material actuators 1326 that are formed in respective circumferentially spaced sector shape slits in the housing 1210. The axially upper surfaces of the stimuli sensitive material actuators 1326 are exposed to inert gas by the inert gas plenum 1246. Alternatively or simultaneously, the stimuli sensitive material actuators 1326 are exposed at their radially outer ends to the ullage space 84 of the fuel tank 36 by means of respective circumferentially spaced flow passages 1328 that extend axially through the housing 1210 wall and through respective ports 1330 in the wall 812 of the fuel tank 36. The stimuli sensitive material actuators 1326 are angularly positioned such that as the disk 1236 is moved rotationally clockwise by the shaft 1220, the stimuli sensitive material actuators 1326 increasingly align/overlap angularly relative to the radial passages 1276.

The valve adjuster 1214 is mechanically coupled to the vent air valve 1280, which controls flow of vent air 30 from the ambient atmosphere to the tank 36, and to the inert gas valve 1290, which controls flow of inert gas 32 from the inert gas source 60 (FIG. 1) to the tank 36. The valve adjuster 1214 is configured to passively adjust the vent air valve 1280 and the inert gas valve 1290 in response to a pressure differential between ambient atmosphere 500 and pressure 502 of the tank 36. Thus, as atmospheric pressure 500 increases relative to tank pressure 502, for example during a descent phase of the aircraft, the air in poppet 1242 is urged rightward in FIG. 24 and the air out poppet 1244 seats in a closed position. The rightward movement of the air in poppet 1242 causes the vent air valve 1280 to open or further open, allowing a greater amount of ambient air to flow through the vent air valve 1280 and the axially extending passage 1274 to the mixer 1238 and tank 36. The rightward movement of the air in poppet 1242 also rotates the gear wheel 1222 clockwise, which in turn by means of a linear to rotational movement actuator 1364 rotates the shaft 1220 and disk 1236 clockwise, causing the inert gas valve 1290 to open or further open, thereby allowing a greater amount of inert gas, for example NEA, to flow through the inert gas valve 1290 and to the mixer 1238 and tank 36. As atmospheric pressure 500 decreases relative to tank pressure 502, for example during a climb phase of the aircraft, the air in poppet 1242 is urged leftward in FIG. 23 and the air out poppet 1244 unseats to an open position. The leftward movement of the air in poppet 1242 causes the vent air valve 1280 to close or approach the closed position, allowing less amount of ambient air or tank ullage gas to flow through the vent air valve 1280, the axially extending passage 1274 and the mixer 1238. The leftward movement of the air in poppet 1242 also rotates the gear wheel 122 counterclockwise, which in turn by means of the linear to rotational movement actuator 1364 rotates the shaft 1220 and disk 1236 counterclockwise, causing the inert gas valve 1290 to close or approach the closed position, thereby allowing a less amount of inert gas, for example NEA, to flow through the inert gas valve 1290 and to the mixer 1238.

As will be appreciated, the valve adjuster 1214 mechanically couples the vent air valve 1280 and the inert gas valve 1290 so that the valves 1280, 1290 adjust simultaneously via movement in the air in poppet 1242 in response to increases and decreases in the pressure difference between atmospheric pressure 500 and tank pressure 502. Of course, delays can be incorporated into the responses of the valves 1280, 1290 and/or the pressure differential actuator 1240, for example by lost motion mechanisms or the like, so that adjustments in the valves 1280, 1290 are not simultaneous, or movement in the pressure differential actuator 1240 does not simultaneously translate into movement in the valves 1280, 1290. It will also be appreciated that the vent air valve 1280, the inert gas valve 1290, and the pressure differential actuator 1240, are passively operated components in that their function is driven mechanically by changes in atmospheric pressure 500 and tank pressure 502 rather than electronically by electronic sensors and/or electronic actuators or electronic controllers.

The inert gas valve 1290 is mechanically coupled to the vent air valve 1280 so that flow control of inert gas flow 32 through the inert gas valve 1290 is proportional (or dependent in a predefined manner) to flow control of vent air 30 through the vent air valve 1280 in response to the pressure differential between the ambient atmospheric pressure 500 and the tank pressure 502. In the FIGS. 22 and 23 valve adjuster 1214, the vent air valve 1280 provides an adjustable effective flow area 1370 between the air in poppet 1242 and the housing 1210 wall, and the inert gas valve 1290 provides an adjustable effective flow area 1372 by the angular alignment/overlap, of the stimuli sensitive material actuators 1326 relative to the radial passages 1276. Changes in the effective flow area 1370 relative to the effective flow area 1372 yield the proportional flow control, i.e., control over the flow ratio of vent air and inert gas. For example, in an initial air in poppet 1242 rightward movement and corresponding clockwise rotational movement of the disk 1236 due to increased atmospheric pressure 500, the effective area 1370 may be equal to the effective area 1372 such that the proportion of vent air flow 30 admitted by the vent air valve 1280 to inert gas flow 32 admitted by the inert gas valve 1290 is substantially one to one during the initial increased atmospheric pressure 500. In a further rightward movement in the air in poppet 1242 and corresponding clockwise rotational movement of the disk 1236 due to further increased atmospheric pressure 500, the effective area 1370 may become greater than the effective area 1372 such that the amount of vent air flow 30 admitted by the vent air valve 1280 is proportionally greater than the amount of inert gas flow 32 admitted by the inert gas valve 1290 during the further increased atmospheric pressure 500.

The stimuli sensitive material actuators 1326 are configured to passively adjust the inert gas valve 1290 based on the oxygen concentration in the high flow inert gas line 124 and the ullage space 84 of the fuel tank 36. Here, direct passive macroscopic flow control is achieved by providing a large enough area of stimuli sensitive material wetted by the inert gas flow and/or the tank ullage gas, so that small-scale volumetric/length changes of the stimuli sensitive materials due to changes in oxygen concentration, provide for macroscopic NEA flow control. The stimuli sensitive material actuators 1326 of the FIG. 22 embodiment utilize a stimuli sensitive material in the family of polymers or gels, for example. The expansion and contraction behavior of the stimuli sensitive material will depend on the properties and geometry of the material. In one form, the stimuli sensitive material may be made up of a stimuli sensitive polymer material. In another form, the stimuli sensitive material may be made up of a stimuli sensitive gel material.

The stimuli sensitive material actuators 1326 operate in a similar manner as the stimuli sensitive material actuators 926 described with respect to FIG. 18. Thus, an increase in oxygen concentration in the high flow inert gas line 124 and/or the ullage space 84 of the fuel tank 36 will cause the stimuli sensitive material of the stimuli sensitive material actuators 1326 to expand, so that central pore areas 950 are relatively larger than before the change in oxygen concentration. As such, an increase in atmospheric pressure 500 relative to tank pressure 502 will cause the inert gas valve 1290 to allow a proportionately greater amount of inert gas flow relative to the amount of vent air flow allowed by the vent air valve 1280 owing to the enlarging of the central pore areas 950 of the actuators 1326. On the other hand, a decrease in oxygen concentration in the high flow inert gas line 124 and the ullage space 84 of the fuel tank 36 will cause the stimuli sensitive material of the stimuli sensitive material actuators 1326 to contract, so that the central pore areas 950 are relatively smaller than before the change in oxygen concentration. As such, a decrease in atmospheric pressure 500 relative to tank pressure 502 will cause the inert gas valve 1290 to allow a proportionately less amount of inert gas flow relative to the amount of vent air flow allowed by the vent air valve 1280 owing to the reduced size central pore areas 950 of the stimuli sensitive material actuators 1326.

The aircraft inerting and venting system 10 can include any of the afore described inert gas and vent air control assemblies 12, 800, 1000, 1100, 1200 that utilize stimuli-sensitive materials for mechanical passive control (either directly or via a mechanical amplification mechanism) or electrochemical sensing and electrical actuation, for example by means of an electronic controller and an electrical energy source. The length scale and flow velocities of such inert gas and vent air control assemblies 12, 800, 1000, 1100, 1200 may be on the order of [cm] and [m/s], respectively. The nature of an inert gas and vent air control assembly in accordance with the invention, however, provides for device implementation at a smaller scale. The inventors have found that with proper miniaturization, the inert gas and vent air control assembly can be used for relatively smaller confinements, or a suitably sized fuel tank compartment, where local pressure and gas composition across the confinement(s) are controlled by using a distributed system of properly miniaturized inert gas and vent air control assemblies which provide interaction of the confinement(s) with the surroundings via passively controlled gas-phase exchange.

Figure 24:
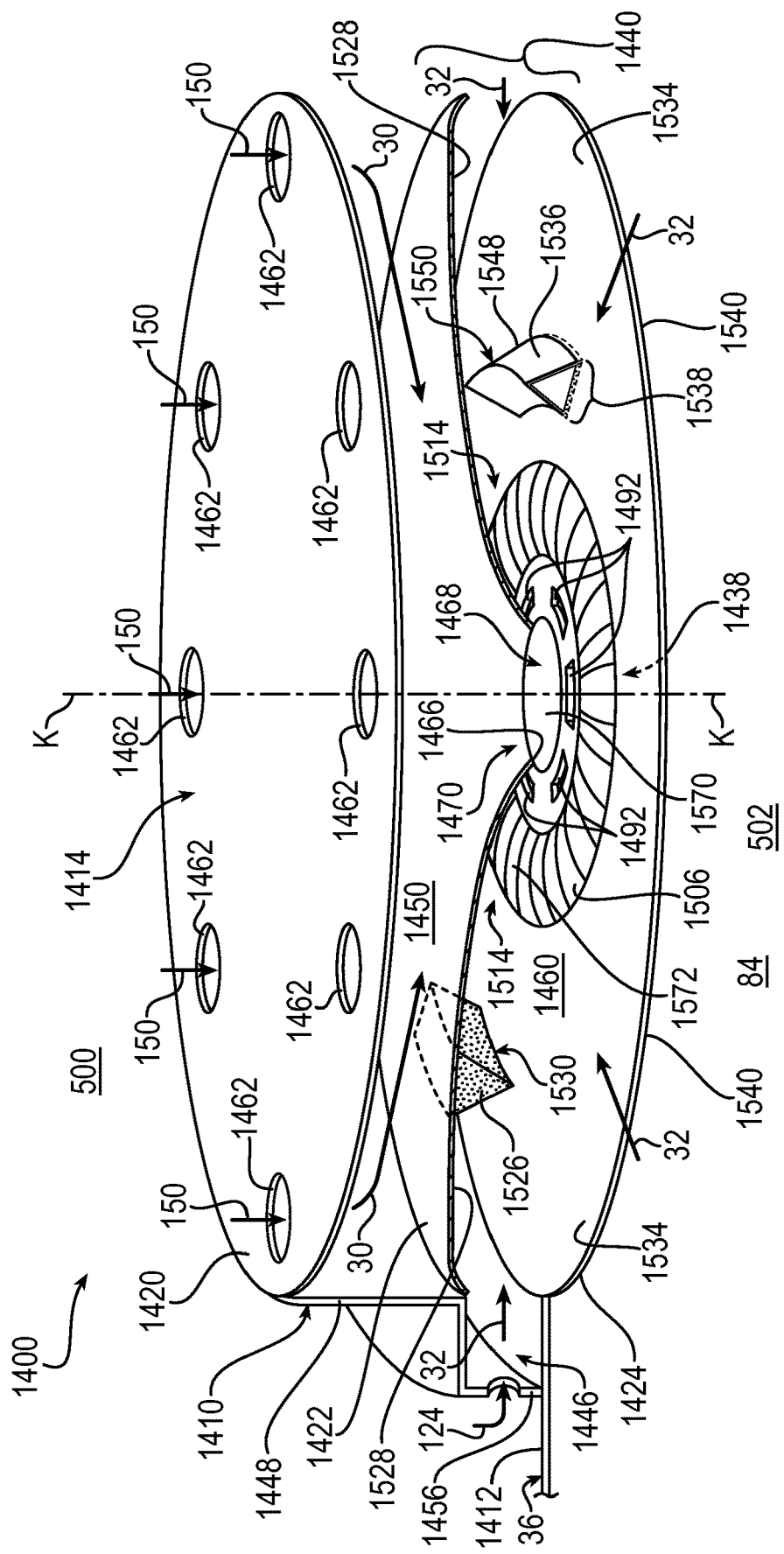
FIG. 24 is a schematic diagram of a perspective view of an inert gas and vent air control assembly according to another embodiment of the invention.

FIGS. 24 and 25 illustrate such a miniaturized inert gas and vent air control assembly 1400. The inert gas and vent air control assembly 1400 can utilize for example active polymer gel actuators or stimuli-responsive polymers/gels, of the similar type as described for example by S. Maeda, et al. ("Active Polymer Gel Actuators," Int. J. Mol. Sci. 2010, 11, 52-66), by Lei, Zhang, Shi and Zhu (Langmuir 2015, vol. 31, no. 7, pp. 2196-2201; ACS Macro Lett. 2017, no. 6, pp. 515-522) or by Zhang and Zhu (ACS Macro Lett., 2014, vol. 3, no. 8, pp. 743-746). The miniature inert gas and vent air control assembly 1400 allows for direct (non-amplified) passive response of the valve system to oxygen (or other gas) concentration within the confined space and the surroundings apart from valve reaction to or activation by prevailing pressure conditions. Similar to the stomatal pore in the surface (epidermis) of a plant leaf, and the respective exchange of ions and/or protons and eventually water across the boundaries of its guard cells, the inert gas and vent air control assembly 1400 features flexible materials, which deform due to pressure and/or pressure differences and stimuli-sensitive materials which expand or contract (in volume) due to oxygen (or other gas) concentration present at their respective surfaces.

Referring to FIGS. 24 and 25, the inert gas and vent air control assembly 1400 includes a housing 1410 mounted to a fuel tank wall 1412, a valve adjuster 1414 including a multi layer structure of a top layer 1420, a middle layer 1422 and a bottom layer 1424 and an integrated pressure differential actuator 1440, a mixer 1438 formed by a lower central portion of the multi layer structure, and an inert gas plenum 1446. The top layer 1420 and middle layer 1422 are supported at their perimeters by an axially extending wall 1448 of the housing 1410 and define therebetween a vent air passage 1450. The inert gas plenum 1446 is contained within a lower axially extending wall 1456 of the housing 1410. The bottom layer 1424 is supported at its perimeter by the fuel tank wall 1412 and together with the middle layer 1422 defines a high flow inert gas passage 1460 therebetween in fluid communication with the inert gas plenum 1446.

Figure 25A:
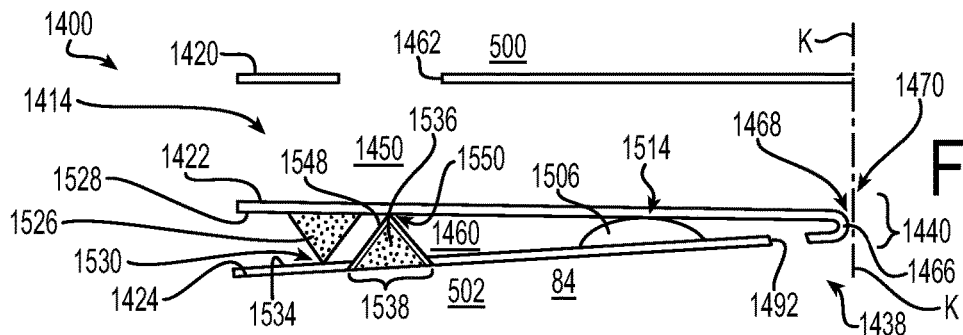
FIGS. 25A-25E are sectional schematic diagrams of the inert gas and vent air control assembly of FIG. 24 showing the assembly in different operating conditions.
Figure 25B:
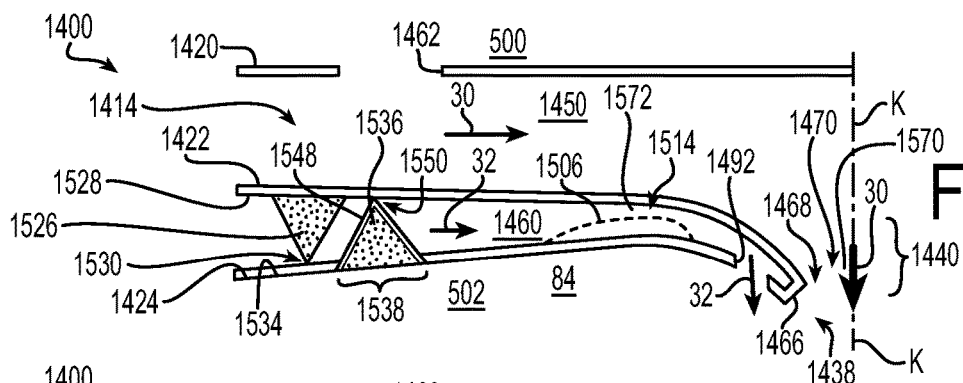
Figure 25C:
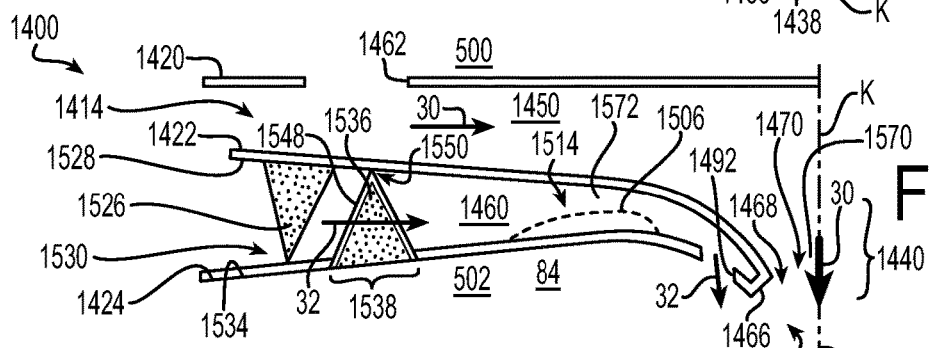
Figure 25D:
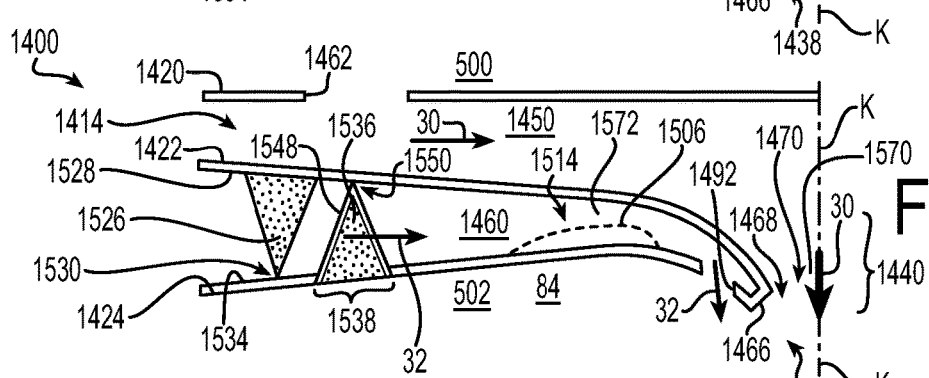
Figure 25E:
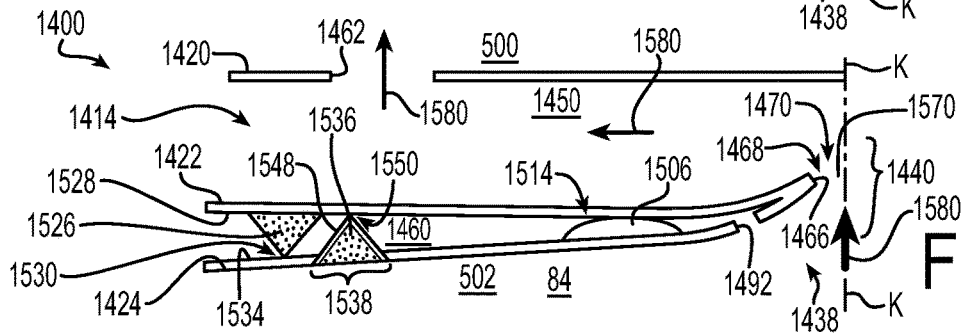

Each of the top layer 1420, the middle layer 1422, and the bottom layer 1424 has a circular shape and is disposed along an axis K-K that extends through the centers of the layers 1420, 1422, 1424. The top layer 1420 and middle layer 1422 are axially spaced apart to form the vent air passage 1450 therebetween. The top layer 1420 has a plurality of circumferentially spaced openings 1462, eight in the illustrative embodiment, for allowing vent air 30 for example from the fuel tank vent line 150 to enter the vent air passage 1450. The middle layer 1422 and bottom layer 1424 are connected structurally at a location near their centers and so as to define a centrally located radially expandable and contractible perforation. In the illustrative embodiment, the connection is an annular shape connection 1466 with a perforation 1468 being defined by the central opening of the annular shape connection 1466. The middle and bottom layers 1422, 1424, which form part of the pressure differential actuator 1440, are made of a flexible silicon material or the like with tunable stiffness so as to function in a manner similar to a silicon or rubber membrane actuator upon an applied pressure difference across the upper surface of the middle layer 1422 and the lower surface of the bottom layer 1424. A vent air valve 1470 is formed by the perimeter of the perforation 1468 such that as the pressure differential actuator 1440 flexes or bends axially downward, for example in response to an increase in atmospheric pressure 500 relative to tank pressure 502, the pressure differential actuator 1440 urges the vent air valve 1470 to open (FIGS. 25B-25D), and such that as the pressure differential actuator 1440 flexes or bends axially upward, for example in response to a decrease in atmospheric pressure 500 relative to tank pressure 502, the pressure differential actuator 1440 urges the vent air valve 1470 to close (FIG. 25A) or open in a reverse direction (FIG. 25E).

Radially outward from the annular shape connection 1466, the middle layer 1422 and bottom layer 1424 are axially spaced apart to form the high flow inert gas passage 1460. The high flow inert gas passage 1460 is supplied with inert gas flow 32 for example from the inert gas generator 60 via the inert gas plenum 1446. A plurality of circumferentially spaced openings 1492, arc shaped slots in the illustrative embodiment, are formed in the bottom layer 1424 radially outward from the perforation 1468. An annular substructure 1506 is located on the bottom layer 1424 between the middle layer 1422 and the bottom layer 1424, and radially outward from the plurality of circumferentially spaced openings 1492. The annular substructure 1506 is connected to the bottom layer 1424 to mechanically couple the annular substructure 1506 to the pressure differential actuator 1440 such that actuation of the pressure differential actuator 1440 distorts and stretches or compresses the annular substructure 1506. An inert gas valve 1514 is formed between the annular substructure 1506 and the lower surface of the middle layer 1422 such that as the pressure differential actuator 1440 flexes or bends axially downward, for example in response to an increase in atmospheric pressure 500 relative to tank pressure 502, the pressure differential actuator 1440 urges the inert gas valve 1514 to open (FIGS. 25B-25D), and such that as the pressure differential actuator 1440 flexes or bends axially upward, for example in response to a decrease in atmospheric pressure 500 relative to tank pressure 502, the pressure differential actuator 1440 urges the inert gas valve 1514 to close (FIGS. 25A and 25E). As will be appreciated, in FIG. 25A there is no distortion in the annular substructure 1506, whereas in FIGS. 25B-25D the pressure differential actuator 1440 distorts and stretches the annular substructure 1506 to lower the height of the annular substructure 1506, and in FIG. 25E the pressure differential actuator 1440 distorts and compresses the annular substructure 1506 to increase the height of the annular substructure 1506. In FIG. 22A, the annular substructure 1506 is in its undistorted state and as such the inert gas valve 1514 is closed.

The middle layer 1422 includes a plurality of circumferentially spaced stimuli sensitive material actuators 1526 disposed radially outward from the annular substructure 1506. In FIG. 24, only one stimuli sensitive material actuator 1526 is shown for purposes of clarity. The stimuli sensitive material actuators 1526 project axially downward from an axially lower surface 1528 of the middle layer 1422 and have an arc shape in axial cross section and a triangle shape in radial cross section. As best shown in FIGS. 25A-25E, the stimuli sensitive material actuators 1526 project axially into the high flow inert gas passage 1460 and thus are exposed to the inert gas flow 32 from the inert gas plenum 1446 and high flow inert gas line 124. An axially distal end 1530 of the stimuli sensitive material actuators 1526 abuts an axially upper surface 1534 of the bottom layer 1424. The stimuli sensitive material actuators 1526 expand and contract in response to respective increases and decreases in the oxygen concentration in the inert gas passage 1460. Expansion results in the distal ends 1530 moving axially downward, urging the middle layer 1422 and bottom layer 1424 axially apart. Contraction results in the distal ends 1530 moving axially upward and consequently the middle layer 1422 and bottom layer 1424 flexing toward one another until they reach a state when the distal ends 1530 no longer contact the upper surface 1534 of the bottom layer 1424.

The bottom layer 1424 includes a plurality of circumferentially spaced stimuli sensitive material actuators 1536 disposed radially between the stimuli sensitive material actuators 1526 and the annular substructure 1506. In FIG. 24, only one stimuli sensitive material actuator 1536 is shown for purposes of clarity. The stimuli sensitive material actuators 1536 and the stimuli sensitive material actuators 1526 can be on separate radii as shown and have the same circumferential spacing and arrangement, or be on the same radius and be circumferentially staggered relative to one another. The stimuli sensitive material actuators 1536 are formed in respective circumferentially spaced slits in the bottom layer 1424, and project axially upward through the thickness of the bottom layer 1424. Thus, a lower surface 1538 of the stimuli sensitive material actuators 1536 is flush with a lower surface 1540 of the bottom layer 1424. The stimuli sensitive material actuators 1536 have an arc shape in axial cross section and a triangle shape in radial cross section. As best shown in FIGS. 25A-25E, the stimuli sensitive material actuators 1536 project axially into the high flow inert gas passage 1460, but are exposed at their lower surfaces 1538 to the ullage space 84 of the fuel tank 36. In addition, as shown in FIGS. 25A-25E, the portions of the stimuli sensitive material actuators 1536 projecting axially upward into the high flow inert gas passage 1460 include an insulation layer 1548 to insulate the NEA wetted area from the stimuli sensitive material. As such, only the lower surfaces 1538 of the stimuli sensitive material actuators 1536 are exposed to the ullage space 84 of the tank 36. An axially distal end 1550 of the stimuli sensitive material actuators 1536 abuts the axially lower surface 1528 of the middle layer 1422. The stimuli sensitive material actuators 1536 expand and contract in response to respective increases and decreases in the oxygen concentration in the ullage space 84 of the fuel tank 36. Expansion results in the distal ends 1550 moving axially upward, urging the middle layer 1422 and bottom layer 1424 axially apart. Contraction results in the distal ends 1550 moving axially downward and consequently the middle layer 1422 and bottom layer 1424 flexing toward one another until they reach a state when the distal ends 1550 no longer contact the lower surface 1528 of the middle layer 1422.

The valve adjuster 1414 is mechanically coupled to the vent air valve 1470, which controls flow of vent air 30 from the ambient atmosphere to the tank 36, and to the inert gas valve 1514, which controls flow of inert gas 32 from the inert gas source 60 (FIG. 1) to the tank 36. The valve adjuster 1414 is configured to passively adjust the vent air valve 1470 and the inert gas valve 1514 in response to a pressure differential between ambient atmosphere 500 and pressure 502 of the tank 36. Thus, as atmospheric pressure 500 increases relative to tank pressure 502, for example during a descent phase of the aircraft, the pressure differential actuator 1440 is urged downward as in FIGS. 24 and 258-25D. The downward bending movement of the pressure differential actuator 1440 causes the perforation 1468 to radially expand and consequently the vent air valve 1470 to open or further open, allowing a greater amount of ambient air to flow through the vent air valve 1470 to the mixer 1438 and tank 36. The downward bending movement of the pressure differential actuator 1440 also causes the annular substructure 1506 to deform and stretch and consequently the inert gas valve 1514 to open or further open, thereby allowing a greater amount of inert gas, for example NEA, to flow through the inert gas valve 1514 and to the mixer 1438 and tank 36. As atmospheric pressure 500 decreases relative to tank pressure 502, for example during a climb phase of the aircraft, the pressure differential actuator 1440 is urged upward, for example from the position shown in FIGS. 25B-25D to the position shown in FIG. 25A. The upward movement of the pressure differential actuator 1440 causes the perforation 1468 to radially contract and consequently the vent air valve 1470 to close (FIG. 25A) or approach the closed position, allowing less amount of ambient air to flow through the vent air valve 1470 to the mixer 1438 and tank 36. The upward movement of the pressure differential actuator 1440 also causes the annular substructure 1506 to relax from its stretched position and consequently the inert gas valve 1514 to close (FIG. 25A) or approach the closed position, thereby allowing a less amount of inert gas, for example NEA, to flow through the inert gas valve 1514 and to the mixer 1438 and tank 36.

Further, in situations where the tank pressure 502 is relatively greater than the atmospheric pressure 500, the pressure differential actuator 1440 may move upward from the position shown in FIG. 25A to the position shown in FIG. 25E. In such case, the upward bending movement of the pressure differential actuator 1440 causes the perforation 1468 to radially expand and consequently the vent air valve 1470 to open or further open, allowing gas 1580 in the ullage space 84 of the tank 36 to flow through the vent air valve 1470 to the vent air passage 1450 and to the atmosphere. Further in such case, the upward bending movement of the pressure differential actuator 1440 also causes the annular substructure 1506 to deform and compress and consequently the inert gas valve 1514 to remain closed (FIG. 25E), thereby preventing gas 1580 from the ullage space 84 of the tank 36 from flowing through the inert gas valve 1514.

As will be appreciated, the valve adjuster 1414 mechanically couples the vent air valve 1470 and the inert gas valve 1514 so that the valves 1470, 1514 adjust simultaneously via movement in the pressure differential actuator 1440 in response to increases and decreases in the pressure difference between atmospheric pressure 500 and tank pressure 502. Of course, delays can be incorporated into the responses of the valves 1470, 1514 and/or the pressure differential actuator 1440, for example by lost motion mechanisms, material response latencies or the like, so that adjustments in the valves 1470, 1514 are not simultaneous, or movement in the pressure differential actuator 1440 does not simultaneously translate into movement in the valves 1470, 1514. It will also be appreciated that the vent air valve 1470, the inert gas valve 1514, and the pressure differential actuator 1440, are passively operated components in that their function is driven mechanically by changes in atmospheric pressure 500 and tank pressure 502 rather than electronically by electronic sensors and/or electronic actuators or electronic controllers.

The inert gas valve 1514 is mechanically coupled to the vent air valve 1470 so that flow control of inert gas flow 32 through the inert gas valve 1514 is proportional or coupled (in a predetermined fashion) to flow control of vent air 30 through the vent air valve 1470 in response to the pressure differential between the ambient atmospheric pressure 500 and the tank pressure 502. In the FIG. 24 valve adjuster 1414, the vent air valve 1470 provides an adjustable effective flow area 1570 determined by the area inside of the perimeter of the perforation 1468, and the inert gas valve 1514 provides an adjustable effective flow area 1572 by the axially extending circumferential gap between the annular substructure 1506 and the axially lower surface 1528 of the middle layer 1422. Changes in the effective flow area 1570 relative to the effective flow area 1572 yield the proportional flow control, i.e., control over the flow ratio of vent air and inert gas. For example, in an initial downward bending movement in the pressure differential actuator 1440 due to increased atmospheric pressure 500, the effective area 1570 may be equal to the effective area 1572 such that the proportion of vent air flow 30 admitted by the vent air valve 1470 to inert gas flow 32 admitted by the inert gas valve 1514 is substantially one to one during the initial increased atmospheric pressure 500. In a further downward bending movement in the pressure differential actuator 1440 due to further increased atmospheric pressure 500, the effective area 1570 may become greater than the effective area 1572 such that the amount of vent air flow 30 admitted by the vent air valve 1470 is proportionally greater than the amount of inert gas flow 32 admitted by the inert gas valve 1514 during the further increased atmospheric pressure 500.

The stimuli sensitive material actuators 1526 and 1536 are configured to passively adjust the inert gas valve 1514 based on the oxygen concentration in the respective high flow inert gas line 124 and the ullage space 84 of the fuel tank 36. The stimuli sensitive material actuators 1526, 1536 of the FIG. 24 embodiment utilize a stimuli sensitive material in the family of polymers or gels, for example. The expansion and contraction behavior of the stimuli sensitive material will depend on the properties and geometry of the material. In one form, the stimuli sensitive material may be made up of a stimuli sensitive polymer material. In another form, the stimuli sensitive material may be made up of a stimuli sensitive gel material. Thus, an increase in oxygen concentration in the high flow inert gas line 124 or the ullage space 84 of the fuel tank 36 will cause the stimuli sensitive material of the respective stimuli sensitive material actuators 1526, 1536 to expand, so that the respective axially distal ends 1530, 1550 of the stimuli sensitive material actuators 1526, 1536 urge the middle layer 1422 and bottom layer 1424 apart (or further apart) thereby increasing the effective flow area 1572 for inert gas flow 32 relative to before the change in oxygen concentration. As such, an increase in atmospheric pressure 500 relative to tank pressure 502 will cause the inert gas valve 1514 to allow a proportionately greater amount of inert gas flow relative to the amount of vent air flow allowed by the vent air valve 1470 owing to the enlarging of the effective flow area 1572 by the actuators 1526 and/or 1536. On the other hand, a decrease in oxygen concentration in the high flow inert gas line 124 or the ullage space 84 of the fuel tank 36 will cause the stimuli sensitive material of the respective stimuli sensitive material actuators 1526, 1536 to contract, so that the respective axially distal ends 1530, 1550 of the stimuli sensitive material actuators 1526, 1536 retract, causing the middle layer 1422 and bottom layer 1424 to flex toward one another (or closer toward one another) thereby decreasing the effective flow area 1572 for inert gas flow 32 relative to than before the change in oxygen concentration. As such, an increase in atmospheric pressure 500 relative to tank pressure 502 will cause the inert gas valve 1514 to allow a proportionately less amount of inert gas flow relative to the amount of vent air flow allowed by the vent air valve 1470 owing to the reduction in effective flow area 1572 by the stimuli sensitive material actuators 1526, 1536.

In one form, the annular substructure 1506 can be configured to block inert gas flow 32 from flowing between the middle layer 1422 and bottom layer 1424 as long as the vent air valve 1470, or perforated membrane valve 1470, is closed. Upon opening of the vent air valve 1470, vent air starts flowing across the opening provided by the now expanded perforation 1468. The downward axially bending or flexing of the pressure differential actuator 1440 causes the annular substructure 1506, which may also be referred to as the donut valve portion of the inert gas valve 1514, to open and allow the inert gas flow 32 to flow across the inert gas valve 1514, through the circumferentially spaced openings 1492, and to the mixer 1438, thereby mixing with the vent air flow 30. Thus, the flow of inert gas 32 can be metered via the inert gas valve 1514 and the flow of vent air 30 can be metered by the vent air valve 1470. The effective flow areas 1570, 1572 of both valves 1470, 1514 and their respective changes can be tuned by means of their structural connection and material properties of the overall arrangement.

As will be appreciated, the mixers 838, 1238, 1438 in FIGS. 17, 22 and 24 can incorporate any of the structures of the mixers 24, 284, 424, 444 in FIGS. 2, 6, 10 and 11, and may be installed at the tank/vent line interface 498, for example, at the inside of the tank wall as shown in FIG. 1, the outside of the tank wall as shown in FIGS. 2, 6, 10 and 11, or partially at the inside wall and partially at the outside wall. By mounting the mixer at the tank/vent line interface, the momentum of the mixing NEA and ambient air stream and the resulting expanding jet imparts a mixing action with the existing gases in the ullage space 84. It will be appreciated, of course, that the mixer 24, 284, 424, 444, 838, 1238, 1438 can be mounted at a location upstream from the tank/vent line interface or even downstream from the tank/vent line interface, for example, where volumetric or other design constraints so dictate. As such, the mixer can be mounted to the vent line or to internal tank structure.

The aircraft inerting and venting system 10 can employ any one or more of the inert gas and vent air control assemblies 12, 800, 1000, 1100, 1200, 1400. The distributed system and method allows for simultaneous/direct passive control of inflow ratios of inert gas 32 and vent air 30, and fuel tank pressure 30, in a compact and energy efficient design. The system and methods control inert gas flow and vent air flow based on tank pressure 502 and ambient pressure 500 conditions and efficiently mix the inert gas flow 32 with inflowing (into the fuel tank 36) vent air 30 in a coflowing configuration rather than a mixing chamber where the dynamic head of both the vent air flow and the NEA jet is not optimally used.

The aircraft inerting and venting system 10 efficiently mitigates the possibility of oxygen concentration overshoots in the fuel tank 36 particularly during aircraft descend, by mixing the inert gas flow 32 during the high flow mode with the outside vent air flow 32 by means of a number of any one or more of the inert gas and vent air control assemblies 12, 800, 1000, 1100, 1200, 1400 at, for example, locations where the aircraft vent lines join the various fuel tank compartments 40, 42, 44. The aircraft inerting system 10 passively adjusts to changes in oxygen concentration in the NEA/inert gas supply and/or the tank ullage gas, so that only as much NEA or inert gas is admitted to assure that the tank ullage gas oxygen concentration remains below an allowed limit value. The mixers 24, 284, 424, 444, 838, 1238, 1438 mix the air vent flow 30 with a suitable controlled amount of inert gas flow 32 in a coflowing manner to assure that the mixture of air/inert gas into the fuel tank 36 or fuel tank compartment 40, 42, 44 to which it is connected to is below an allowed value based on specified flammability limits. In addition, the aircraft inerting and venting system 10, and more particularly the valve adjusters 28, 678, 814, 1214, 1414 thereof, control the fuel tank compartment pressure by suitable regulation of the mass flow of vent air 30 and admitted inert gas flow 32 within the aircraft inerting and venting system 10, so that no other flow control mechanism elsewhere (in the inerting system or vent line system) is needed.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An inerting and venting system for an aircraft, comprising:
    a tank containing fluid to be inerted;
    a first valve for controlling flow of vent air from ambient atmosphere to the tank;
    a second valve for controlling flow of inert gas from an inert gas source to the tank; and
    a valve adjuster configured to passively adjust the first and second valves in response to a pressure differential between the ambient atmosphere and the tank;
    wherein the valve adjuster, the first valve, and the second valve are passively operated components that are driven mechanically by changes in atmospheric pressure and tank pressure rather than by electronic sensors.

2. The inerting and venting system of claim 1, wherein the valve adjuster is mechanically coupled to the first and second valves to simultaneously and passively adjust the first and second valves.

3. An inerting and venting system for an aircraft, comprising:
    a tank containing fluid to be inerted;
    a first valve for controlling flow of vent air from ambient atmosphere to the tank;
    a second valve for controlling flow of inert gas from an inert gas source to the tank; and
    a valve adjuster configured to passively adjust the first and second valves in response to a pressure differential between the ambient atmosphere and the tank,
    wherein the second valve is mechanically coupled to the first valve so that flow control of inert gas flow through the second valve is proportional to flow control of vent air through the first valve in response to the pressure differential between the ambient atmosphere and the tank.

4. An inerting and venting system for an aircraft, comprising:
    a tank containing fluid to be inerted;
    a first valve for controlling flow of vent air from ambient atmosphere to the tank;
    a second valve for controlling flow of inert gas from an inert gas source to the tank; and
    a valve adjuster configured to passively adjust the first and second valves in response to a pressure differential between the ambient atmosphere and the tank,
    wherein the valve adjuster includes an actuator responsive to oxygen concentration in the inert gas of the tank ullage gas to change the ratio of the controlled flow of vent air and inert gas admitted through the respective first and second valves.

5. The inerting and venting system of claim 4, wherein the actuator includes an electronic oxygen sensor for sensing oxygen concentration, and an electronic controller that controls movement of the actuator based on the sensed oxygen concentration.

6. An inerting and venting system for an aircraft, comprising:
    a tank containing fluid to be inerted;
    a first valve for controlling flow of vent air from ambient atmosphere to the tank;
    a second valve for controlling flow of inert gas from an inert gas source to the tank; and
    a valve adjuster configured to passively adjust the ratio of the controlled flow of vent air and inert gas admitted through the respective first and second valves based on one or more of an oxygen concentration in an inert gas line communicating inert gas from the inert gas source to the second valve and an oxygen concentration in an ullage space of the tank.

7. The inerting and venting system of claim 6, wherein the valve adjuster includes an actuator responsive to oxygen concentration in the inert gas to proportionately change the controlled flow of vent air and inert gas by the respective first and second valves.

8. The inerting and venting system of claim 7, wherein the actuator includes a stimuli sensitive material actuator.

9. The inerting and venting system of claim 8, wherein the actuator includes an amplifier that amplifies volumetric/length changes in stimuli sensitive material of the stimuli sensitive material actuator.

10. The inerting and venting system of claim 7, wherein the actuator includes a stimuli sensitive polymer actuator.

11. The inerting and venting system of claim 7, wherein the actuator includes a stimuli sensitive gel actuator.

12. The inerting and venting system of claim 7, wherein the actuator expands and contracts in response to respective increase and decrease in oxygen concentration.

13. The inerting and venting system of claim 12, wherein the expansion and contraction respectively increases and decreases an effective flow area of the second valve.

14. The inerting and venting system of claim 12, wherein the expansion and contraction respectively increases and decreases the proportion of inert gas flow admitted by the second valve relative to vent air flow admitted by the first valve.

* * * * *